US005970506A

United States Patent [19]

Kiyan et al.

[11] Patent Number: 5,970,506

[45] Date of Patent: Oct. 19, 1999

[54] SPREADSHEET-CALCULATING SYSTEM AND METHOD

[75] Inventors: Hiroki Kiyan; Takaki Tokuyama; Motohide Tamura, all of Tokushima, Japan

[73] Assignee: Justsystem Corporation, Tokushima, Japan

[21] Appl. No.: 08/886,396

[22] Filed: Jul. 1, 1997

[30] Foreign Application Priority Data

Jan. 20, 1997 [JP] Japan .................................... 9-007991

[51] Int. Cl.$^{6}$ ...................................................... G06F 17/30

[52] U.S. Cl. ............................................................. 707/503

[58] Field of Search .................................... 707/503, 504, 707/508, 509, 506, 507

[56] References Cited

U.S. PATENT DOCUMENTS

| | | | |
|---|---|---|---|
| 5,121,499 | 6/1992 | McCaskill et al. | 395/700 |
| 5,317,686 | 5/1994 | Salas et al. | 395/157 |
| 5,437,006 | 7/1995 | Turski | 395/155 |

FOREIGN PATENT DOCUMENTS

| | | |
|---|---|---|
| 58-66149 | 4/1983 | Japan . |
| 58-178443 | 10/1983 | Japan . |
| 59-212838 | 12/1984 | Japan . |
| 62-236071 | 10/1987 | Japan . |
| 63-225859 | 9/1988 | Japan . |
| 63-255764 | 10/1988 | Japan . |
| 6-161851 | 6/1994 | Japan . |
| 7-36874 | 2/1995 | Japan . |
| 7-175870 | 7/1995 | Japan . |
| 8-180118 | 7/1996 | Japan . |

*Primary Examiner*—Joseph H. Feild
*Assistant Examiner*—Alford W. Kindred
*Attorney, Agent, or Firm*—McDermott, Will & Emery

[57] ABSTRACT

When a spreadsheet is displayed in a display section and spreadsheet calculation is to be executed, by referring to a column or a row with a key entry or pointing device, the column or row can be displayed in the fixed state without overflowing when the spreadsheet on the display screen is scrolled. A limited display range on the spreadsheet can be changed through scrolling when a row or a column not specified as an object for fixed display is to be displayed.

27 Claims, 40 Drawing Sheets

| FILE NAME | CELL INFORMATION | FORMAT INFORMATION |
|---|---|---|
| FILE 1 | CLL 1 | FMT 1 |
| FILE 2 | CLL 2 | FMT 2 |
| ⋮ | ⋮ | ⋮ |
| FILE n | CLL n | FMT n |

FIG.3

| | A(LT/8) | B(IV/5) | C(IV/5) | D(IV/5) | E(IV/5) | F(IV/5) | G(IV/5) | H(IV/5) | I(IV/5) | J(IV/5) | K(RT/10) |
|---|---|---|---|---|---|---|---|---|---|---|---|
| 1 (UP) | A1 | B1 | C1 | D1 | E1 | F1 | G1 | H1 | I1 | J1 | K1 |
| 2 (IV) | A2 | B2 | C2 | D2 | E2 | F2 | G2 | H2 | I2 | J2 | K2 |
| 3 (IV) | A3 | B3 | C3 | D3 | E3 | F3 | G3 | H3 | I3 | J3 | K3 |
| 4 (IV) | A4 | B4 | C4 | D4 | E4 | F4 | G4 | H4 | I4 | J4 | K4 |
| 5 (LW) | A5 | B5 | C5 | D5 | E5 | F5 | G5 | H5 | I5 | J5 | K5 |

NOTES)
* LT .... VALIDITY OF FIXING IN LEFT SIDE, RT ....VALIDITY OF FIXING IN RIGHT SIDE, UP ....VALIDITY OF FIXING IN UPPER SIDE, LW....VALIDITY OF FIXING IN LOWER SIDE, IV ... INVALIDITY OF FIXING

FIG.4

| | A | B | C | D | E | F | G | H | I | J | K |
|---|---|---|---|---|---|---|---|---|---|---|---|
| 1 | TEAM NAME | '90 | '91 | '92 | '93 | '94 | '95 | '96 | '97 | '98 | TOTAL |
| 2 | TM 1 | | | | | | | | | | |
| 3 | TM 2 | | | | | | | | | | |
| 4 | TM 3 | | | | | | | | | | |
| 5 | TOTAL | | | | | | | | | | |

FMT 1

| | | INFORMATION FOR FIXING | SIZE INFORMATION |
|---|---|---|---|
| COLUMN | A | LT | 8 |
| | B | IV | 5 |
| | ⋮ | ⋮ | ⋮ |
| | K | RT | 10 |
| ROW | 1 | UP | TY |
| | 2 | IV | TY |
| | ⋮ | ⋮ | ⋮ |
| | 5 | LW | TY |

FIG.15

| | A | B | C | D | E |
|---|---|---|---|---|---|
| 1 | TEAM NAME | '90 | '91 | '92 | '93 |
| 2 | TM 1 | | | | |
| 3 | TM 2 | | | | |
| 4 | TM 3 | | | | |
| 5 | TOTAL | | | | |

FIG.16

| | A | H | I | J | K |
|---|---|---|---|---|---|
| 1 | TEAM NAME | '96 | '97 | '98 | TOTAL |
| 2 | TM 1 | | | | |
| 3 | TM 2 | | | | |
| 4 | TM 3 | | | | |
| 5 | TOTAL | | | | |

FIG.17

| | A | B | C | D | K |
|---|---|---|---|---|---|
| 1 | TEAM NAME | '90 | '91 | '92 | TOTAL |
| 2 | TM 1 | | | | |
| 3 | TM 2 | | | | |
| 4 | TM 3 | | | | |
| 5 | TOTAL | | | | |

FIG.18

| | A | B | C | D | K |
|---|---|---|---|---|---|
| 1 | TEAM NAME | '90 | '91 | '92 | TOTAL |
| 2 | TM 1 | 2,000 | 1,800 | 2,600 | 6,400 |
| 3 | TM 2 | 1,600 | 2,000 | 2,400 | 6,000 |
| 4 | TM 3 | 3,500 | 3,000 | 2,500 | 9,000 |
| 5 | TOTAL | 7,100 | 6,000 | 7,500 | 21,400 |

FIG.19

| | A | C | D | E | K |
|---|---|---|---|---|---|
| 1 | TEAM NAME | '91 | '92 | '93 | TOTAL |
| 2 | TM 1 | 1,800 | 2,600 | 2,100 | 8,500 |
| 3 | TM 2 | 2,000 | 2,400 | 3,000 | 9,000 |
| 4 | TM 3 | 3,000 | 2,500 | 3,100 | 12,100 |
| 5 | TOTAL | 6,800 | 7,500 | 8,200 | 29,600 |

FIG.20

| | A | D | E | F | K |
|---|---|---|---|---|---|
| 1 | TEAM NAME | '92 | '93 | '94 | TOTAL |
| 3 | TM 2 | 2,400 | 3,000 | 3,400 | 12,400 |
| 4 | TM 3 | 2,500 | 3,100 | 3,700 | 15,800 |
| 5 | TM 4 | 0 | 0 | 5,200 | 5,200 |
| 6 | TOTAL | 7,500 | 8,200 | 15,400 | 45,000 |

FIG.21

| | A | D | E | F | K |
|---|---|---|---|---|---|
| 1 | TEAM NAME | '92 | '93 | '94 | TOTAL |
| 3 | TM 2 | 2,400 | 3,000 | 5,500 | 14,500 |
| 4 | TM 3 | 2,500 | 3,100 | 3,700 | 15,800 |
| 5 | TM 4 | 0 | 0 | 5,200 | 5,200 |
| 6 | TOTAL | 7,500 | 8,200 | 17,500 | 47,100 |

FIG.23

| | A(LT/8) | B(IV/5) | C(IV/5) | D(IV/5) | E(IV/5) | F(IV/5) | G(IV/5) | H(IV/5) | I(IV/5) | J(IV/5) | K(RT/10) |
|---|---|---|---|---|---|---|---|---|---|---|---|
| 1 (UP) | A1 | B1 | C1 | D1 | E1 | F1 | G1 | H1 | I1 | J1 | K1 |
| 2 (IV) | A2 | B2 | C2 | D2 | E2 | F2 | G2 | H2 | I2 | J2 | K2 |
| 3 (IV) | A3 | B3 | C3 | D3 | E3 | F3 | G3 | H3 | I3 | J3 | K3 |
| ⋮ | ⋮ | ⋮ | ⋮ | ⋮ | ⋮ | ⋮ | ⋮ | ⋮ | ⋮ | ⋮ | ⋮ |
| 16(LW) | A16 | B16 | C16 | D16 | E16 | F16 | G16 | H16 | I16 | J16 | K16 |

FIG.28

| | A | B | C | D | E | F | G | K |
|---|---|---|---|---|---|---|---|---|
| 1 | | | | | | | | |
| 2 | | HAMI | DASHI | | HAMI | 567 | HA | |
| 3 | | | | | | | | |
| 4 | | | | | | | | |
| 16 | | | | | | | | |

FIG.32

| | A | B | C | D | E | F | G | H |
|---|---|---|---|---|---|---|---|---|
| 1 | | | | | | | | |
| 2 | | | | | | | | |
| 3 | | | | | | | | |
| 4 | | | | | | | | |
| 16 | | | | | | | | |

FIG.34

| | A | B | C | D | E | F | G | K |
|---|---|---|---|---|---|---|---|---|
| 1 | | | | | | | | |
| 2 | | | | | | | | |
| 3 | | | | | | | | |
| 4 | | | | | | | | |
| 5 | | | | | | | | |

FIG.35

| | A(LT/8) | B(IV/5) | C(IV/5) | D(MD/5) | E(IV/5) | F(IV/5) | G(IV/5) | H(IV/5) | I(IV/5) | J(IV/5) | K(RT/10) |
|---|---|---|---|---|---|---|---|---|---|---|---|
| 1 (UP) | A1 | B1 | C1 | D1 | E1 | F1 | G1 | H1 | I1 | J1 | K1 |
| 2 (IV) | A2 | B2 | C2 | D2 | E2 | F2 | G2 | H2 | I2 | J2 | K2 |
| 3 (IV) | A3 | B3 | C3 | D3 | E3 | F3 | G3 | H3 | I3 | J3 | K3 |
| ⋮ | ⋮ | ⋮ | ⋮ | ⋮ | ⋮ | ⋮ | ⋮ | ⋮ | ⋮ | ⋮ | ⋮ |
| 16(LW) | A16 | B16 | C16 | D16 | E16 | F16 | G16 | H16 | I16 | J16 | K16 |

*MD · · · VALIDITY OF FIXING IN CENTER

FIG.37

| | | | | | | IV/5 | IV/3 | |
|---|---|---|---|---|---|---|---|---|
| | A | C | E | D | F | G | H | K |
| 1 | | | | | | | | |
| 2 | | | | | | | | |
| 3 | | | | | | | | |
| 4 | | | | | | | | |
| 16 | | | | | | | | |

FIG.38

| | A(LT/8) | B(IV/5) | C(IV/5) | D(IV/5) | E(IV/5) | F(IV/5) | G(IV/5) | H(IV/5) | I(IV/5) | J(IV/5) | K(RT/10) |
|---|---|---|---|---|---|---|---|---|---|---|---|
| 1 (UP) | A1 | B1 | C1 | D1 | E1 | F1 | G1 | H1 | I1 | J1 | K1 |
| 2 (IV) | A2 | B2 | C2 | D2 | E2 | F2 | G2 | H2 | I2 | J2 | K2 |
| 3 (MD) | A3 | B3 | C3 | D3 | E3 | F3 | G3 | H3 | I3 | J3 | K3 |
| ••• | ••• | ••• | ••• | ••• | ••• | ••• | ••• | ••• | ••• | ••• | ••• |
| 16(LW) | A16 | B16 | C16 | D16 | E16 | F16 | G16 | H16 | I16 | J16 | K16 |

FIG.39

| | A | B | C | D | E | F | G | K |
|---|---|---|---|---|---|---|---|---|
| 1 | | | | | | | | |
| 2 | | | | | | | | |
| 3 | | | | | | | | |
| 4 | | | | | | | | |
| 16 | | | | | | | | |

FIG.40

| | A | B | C | D | E | F | G | K |
|---|---|---|---|---|---|---|---|---|
| 1 | | | | | | | | |
| 4 | | | | | | | | |
| 3 | | | | | | | | |
| 5 | | | | | | | | |
| 16 | | | | | | | | |

FIG.41

| | A(LT/8) | B(LT/5) | C(IV/5) | D(IV/5) | E(IV/5) | F(IV/5) | G(IV/5) | H(IV/5) | I(IV/5) | J(RT/5) | K(RT/10) |
|---|---|---|---|---|---|---|---|---|---|---|---|
| 1 (UP) | A1 | B1 | C1 | D1 | E1 | F1 | G1 | H1 | I1 | J1 | K1 |
| 2 (UP) | A2 | B2 | C2 | D2 | E2 | F2 | G2 | H2 | I2 | J2 | K2 |
| 3 (IV) | A3 | B3 | C3 | D3 | E3 | F3 | G3 | H3 | I3 | J3 | K3 |
| 4 (LW) | A4 | B4 | C4 | D4 | E4 | F4 | G4 | H4 | I4 | J4 | K4 |
| 5 (LW) | A5 | B5 | C5 | D5 | E5 | F5 | G5 | H5 | I5 | J5 | K5 |

SPREADSHEET-CALCULATING SYSTEM AND METHOD

FIELD OF THE INVENTION

The present invention relates to a spreadsheet-calculating apparatus and, more particularly, to spreadsheet calculation using a table frame.

BACKGROUND OF THE INVENTION

In software for spreadsheet calculation (described as spreadsheet software hereinafter), a table frame in which a plurality of cells each for data input are arrayed in rows and columns; namely a spreadsheet is displayed on a display screen, and spreadsheet calculations such as tabulation are automatically executed by giving data, a formula, or the like to each cell.

Generally a range of cells in which a user can visually inspect is limited to the size of a visible spreadsheet area that can be displayed on a screen. For this reason, when information is to be displayed on a cell outside the visible spreadsheet area or when data is input to a cell outside the visible spreadsheet area, it is necessary to scroll the display area in the vertical and horizontal directions by such as an input device as a mouse.

However, when scrolling is to be carried out, the visible spreadsheet area having been displayed so far is hidden from the display screen. Thus, the scroll operation must always be executed, which is very disadvantageous.

Concerning a main item such as a title for a row or a column, it is useful to display this item for reference during data input in a cell area outside the visible spreadsheet. For this reason, software with additional functionality for fixed display on a spreadsheet has recently appeared for solving the problem as described above.

The technology for this fixed display function has been proposed, for instance, in Japanese Patent Laid-Open Publication No. SHO 58-178443, or in Japanese Patent Laid-Open Publication No. HEI 8-180118.

In Japanese Patent Laid-Open Publication No. SHO 58-178443, when a table is to be prepared, the table is divided to a common item section and a variable item section, and the common item section is always displayed, while the variable item section is arbitrarily divided and the display is scrolled.

In Japanese Patent Laid-Open Publication No. HEI 8-180118, the row or column for holding an item that is always kept displayed in a table is automatically discriminated and displayed in a fixed display section. Portions other than the fixed display section are displayed by issuing a scrolling instruction.

In the conventional technology as described in the patent publications as described above, for both the common item section and fixed display section, the fixed display is provided for a title, so that input of data or an operational expression to a required cell can be executed always with reference to each item in the title row or the title column. For this reason, the troublesome work load in checking each item in a title row or a title column by means of a scroll operation can be eliminated.

However, as when a plan requiring numerical data is to be prepared with a spreadsheet, it sometimes becomes necessary to input or edit data or an operational expression into a data column while referring to a computing result column such as tabulation obtained according to the data or operational expression. Since the computing result column corresponds to the variable item section in the conventional technology, it is necessary to scroll the variable item section in the vertical and horizontal directions if the computing result column is in a not-displayed state.

SUMMARY OF THE INVENTION

It is an object of the present invention to obtain a spreadsheet-calculating apparatus, method and a computer-readable medium storing a program in which the operability of preparing of table can be improved by having an arbitrary row or a column other than a title, such as a computing result column, be displayed in a fixed state.

With the present invention, an arbitrary row is displayed in the fixed state, so that a row other than a title such as a computing result column can always be referred to without scrolling. With this feature it is possible to improve the general operability when a table is prepared.

With the present invention, a display area can be obtained according to a relationship between a specified range and a display screen, so that a row or a column or a combination of the row and column, can be preferentially displayed in the fixed state.

With the present invention, a display size of cells each adjoining a specified range is reduced so that the cells are accommodated in the display range. When the minimized cells are specified, the size of each of the cells is restored to the original size and at the same time other cells in the display range are minimized. Therefore, unless cells adjoining a specified range are specified as an object for an operation such as input of data or an operational expression, a required minimum display size may be preserved for the cells according to a size of the display range.

With the present invention, when information is to be displayed, when the information cannot be accommodated in a cell, a portion of the information is divided and displayed in a cell adjoining the cell not including any information therein. Therefore a display quantity not restricted by the cell size can be acquired without fail, and at the same time it is possible to effectively utilize a display area of a cell not including data therein.

Other objects and features of this invention will become understood from the following description with reference to the accompanying drawings.

BRIEF DESCRIPTION OF THE DRAWINGS

FIG. 2 is a view explaining contents of information stored in a spreadsheet-calculating file storage section;

FIG. 3 is a diagrammatic view showing an example of spreadsheet for explaining format information of a spreadsheet;

FIG. 4 is a view showing an image of a whole spreadsheet for explaining cell information of a spreadsheet;

FIG. 15 is a view showing an example of the display of a spreadsheet when the processing for creating a new spreadsheet is executed;

FIG. 16 is a view showing another example of the display of a spreadsheet when the processing for creating a new spreadsheet is executed;

FIG. 17 is a view showing another example of the display of a spreadsheet when the processing for creating a new spreadsheet is executed;

FIG. 18 is a view showing another example of the display of a spreadsheet when the processing for creating a new spreadsheet is executed;

FIG. 19 is a view showing another example of the display of a spreadsheet when the processing for creating a new spreadsheet is executed;

FIG. 20 is a view showing another example of the display of a spreadsheet when the processing for creating a new spreadsheet is executed;

FIG. 21 is a view showing another example of a spreadsheet when a processing for creating a new spreadsheet is executed;

FIG. 23 is diagrammatic view showing an example of a spreadsheet for explaining format information of a spreadsheet;

FIG. 28 is a view showing an example of display of a spreadsheet either when input data is displayed or when data is displayed in Embodiment 3;

FIG. 32 is a view showing another example of display when a table frame of spreadsheet is displayed according to Embodiment 4;

FIG. 34 is a view showing another example of display of a table frame for a spreadsheet according to Embodiment 4;

FIG. 35 is a diagrammatic view showing an example of a spreadsheet for explaining format information of the spreadsheet according to Embodiment 5;

FIG. 37 is a view showing an example of a table frame for a spreadsheet according to Embodiment 5;

FIG. 38 is a diagrammatic view showing an example of a spreadsheet explaining format information of the spreadsheet according to Embodiment 5;

FIG. 39 s a view showing an example of display of a table frame for a spreadsheet according to Embodiment 5;

FIG. 40 is a view showing an example of display of a table frame for a spreadsheet according to Embodiment 5; and FIG. 41 is a diagrammatic view showing an example of a spreadsheet explaining format information of a spreadsheet having successive fixed display columns or fixed display rows.

DESCRIPTION OF THE PREFERRED EMBODIMENTS

Detailed description is made hereinafter for preferred embodiments of the present invention with reference to the related drawings.

Figure 1:
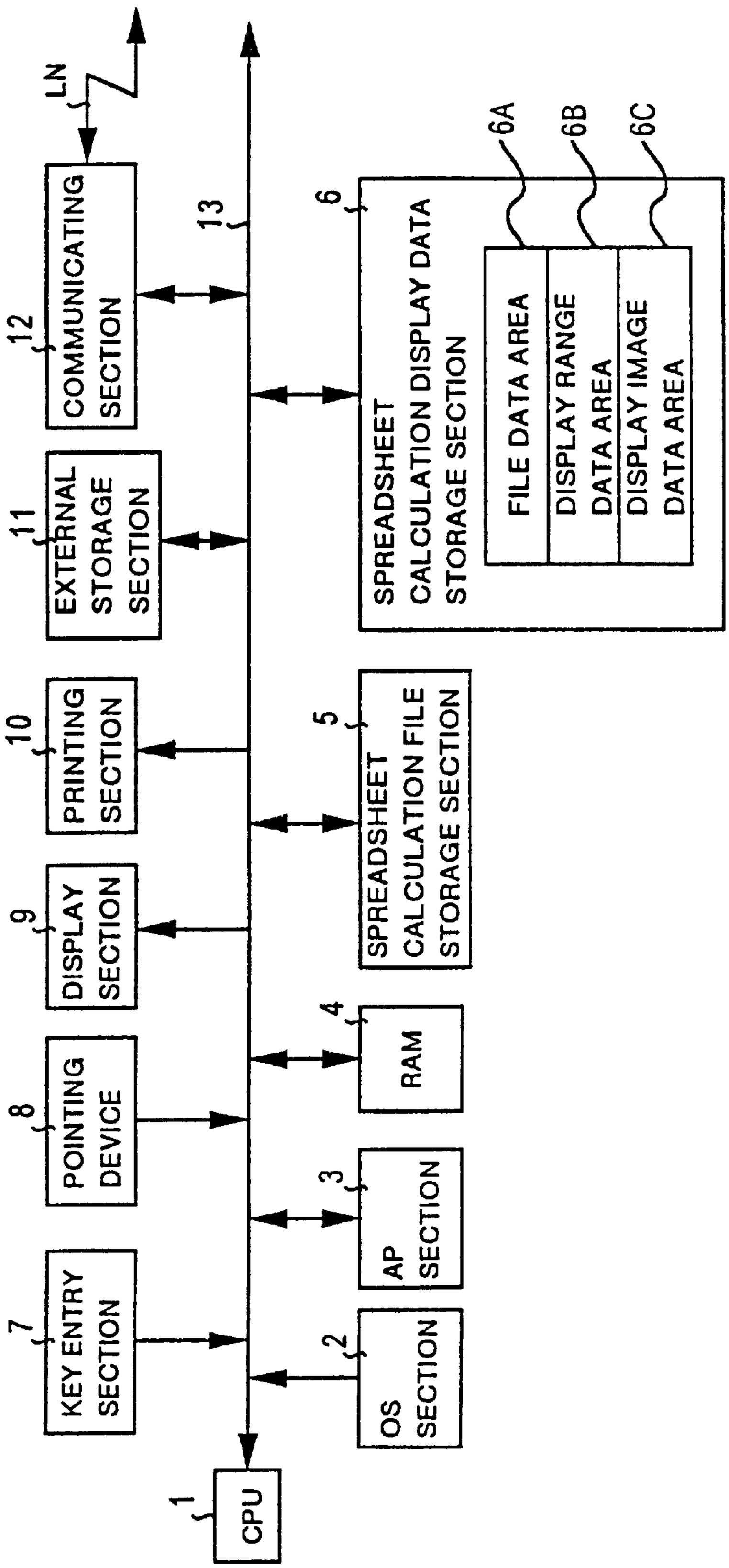
FIG. 1 is a block diagram showing a spreadsheet-calculating apparatus according to Embodiment 1 of the present invention.

FIG. 1 is a block diagram showing a spreadsheet-calculating apparatus according to Embodiment 1 of the present invention. The spreadsheet-calculating apparatus shown in FIG. 1 has a CPU 1 connected to an internal bus 13 and units such as an OS section 2, an AP section 3, a RAM 4, a spreadsheet calculation file storage section 5, a spreadsheet calculation display data storage section 6, a key entry section 7, a pointing device 8, a display section 9, a printing section 10, an external storage section 11, a communicating section 12 or the like each connected to the CPU 1 via the internal bus 3.

The CPU 1 is a central processing unit for controlling each unit connected to the internal bus 13 according to various types of programs such as a spreadsheet calculation or the like supplied from the OS section 2 and AP section 3.

This CPU 1 uses a RAM 4 as a work area at the time of program execution, writes spreadsheet calculation files into or reads spreadsheet calculation files from the spreadsheet calculation file storage section 5 when a spreadsheet calculation is to be executed. The CPU 1 and prepares data for displaying a spreadsheet using the spreadsheet calculation display data storage section 6.

This CPU 1 also receives characters, commands, positional information or the like based on data or coordinate values input from the key entry section 7 or with the pointing device 8. The CPU 1 outputs images to the display section 9 or the printing section 10.

This CPU 1 writes data to or reads data from the external storage section 11, and executes data communications through the communicating section 12.

Next each unit is described.

The OS section 2 is memory for programming an OS (operating system) and storing it therein, while the AP section is memory for storing therein application programs.

The programs stored in the AP section 3 are carried out on an operating system of the OS section 2. The AP section 3 stores therein, for instance, a program executed according to the flow chart shown in FIG. 9 to FIG. 14 and FIG. 22.

Figure 9:
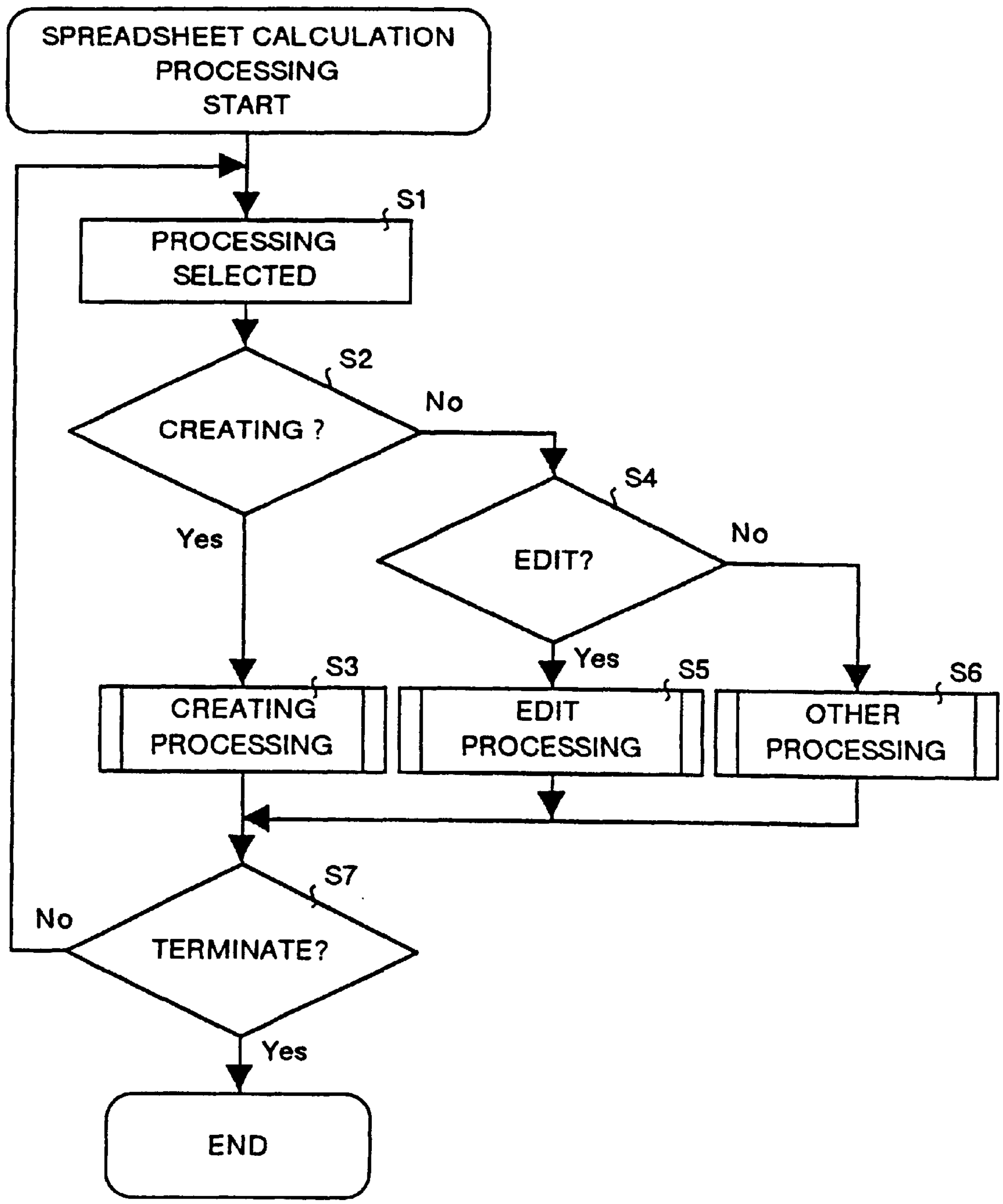
FIG. 9 is a flow chart explaining a spreadsheet-calculating processing.
Figure 10:
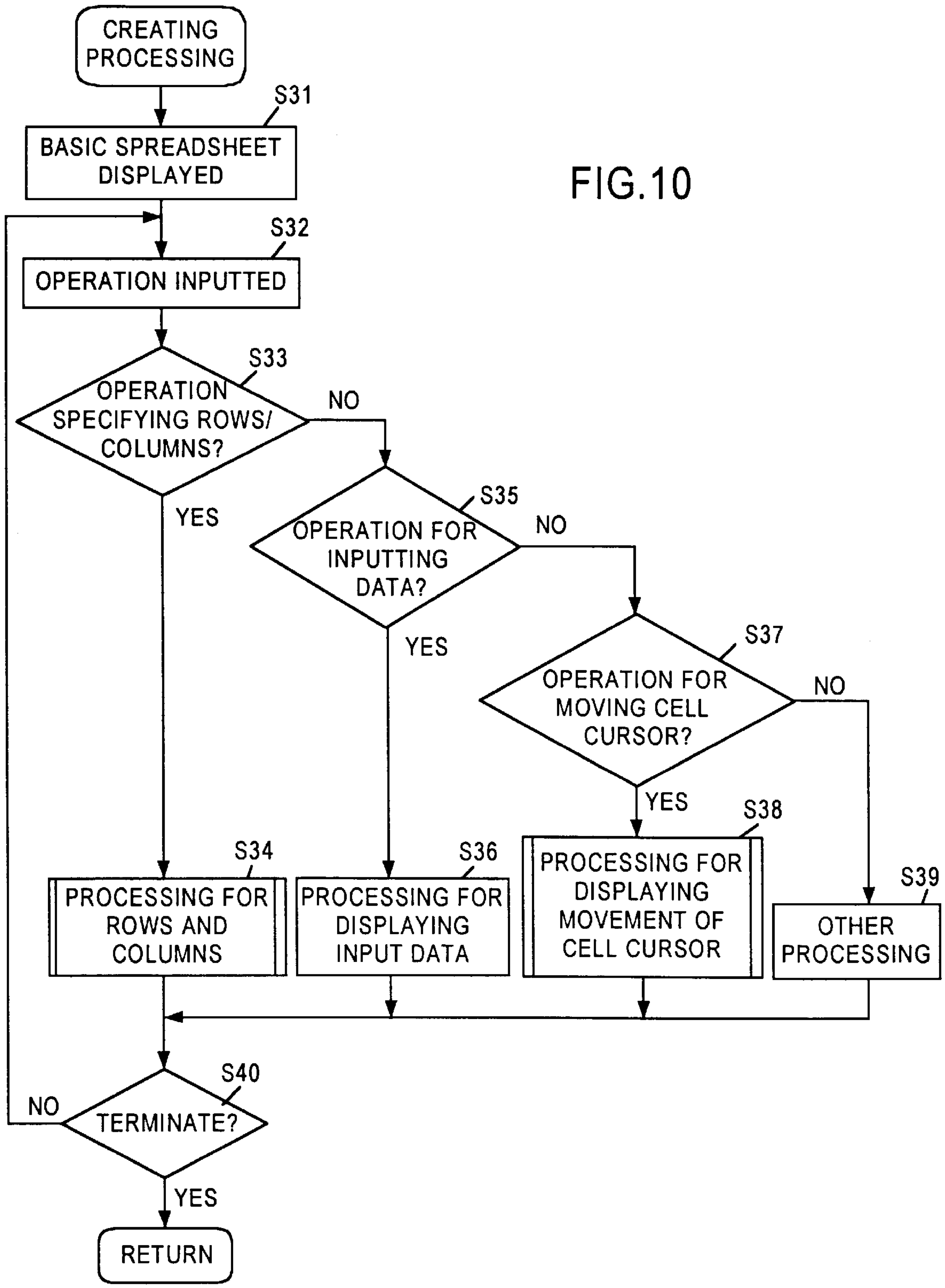
FIG. 10 is a flow chart explaining processing for creating a new spreadsheet in the spreadsheet-calculating processing.

FIG. 9 shows the operation of the main routine for spreadsheet calculation. FIG. 10 shows the operation of creating a spreadsheet which is the operation of initializing a spreadsheet.

Figure 11:
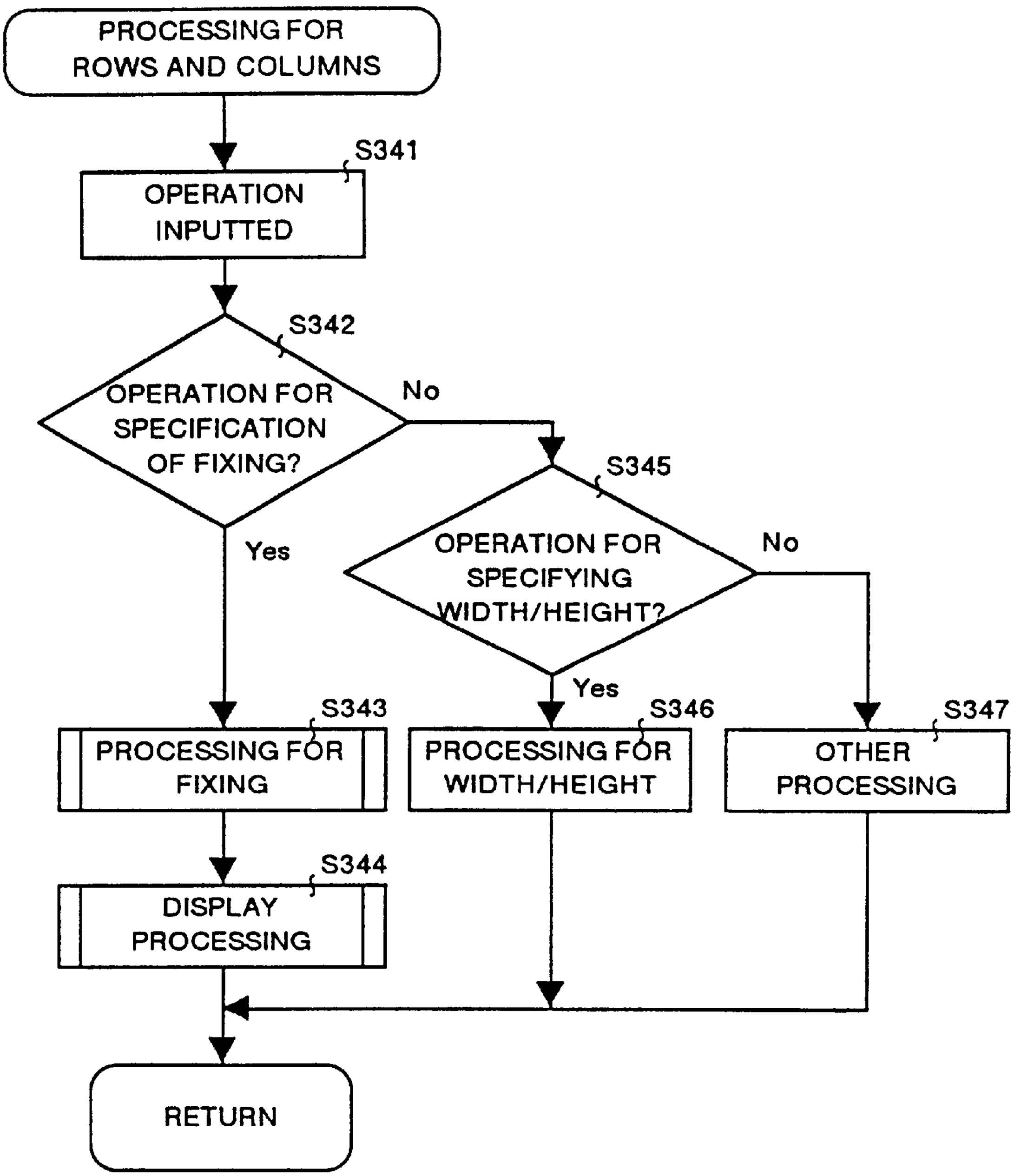
FIG. 11 is a flow chart explaining processing for rows and columns in the processing for creating a new spreadsheet.

FIG. 11 shows the operation of processing for rows and columns, executed for specifying fixing or resizing or the like to any row or column during edit processing.

Figure 12:
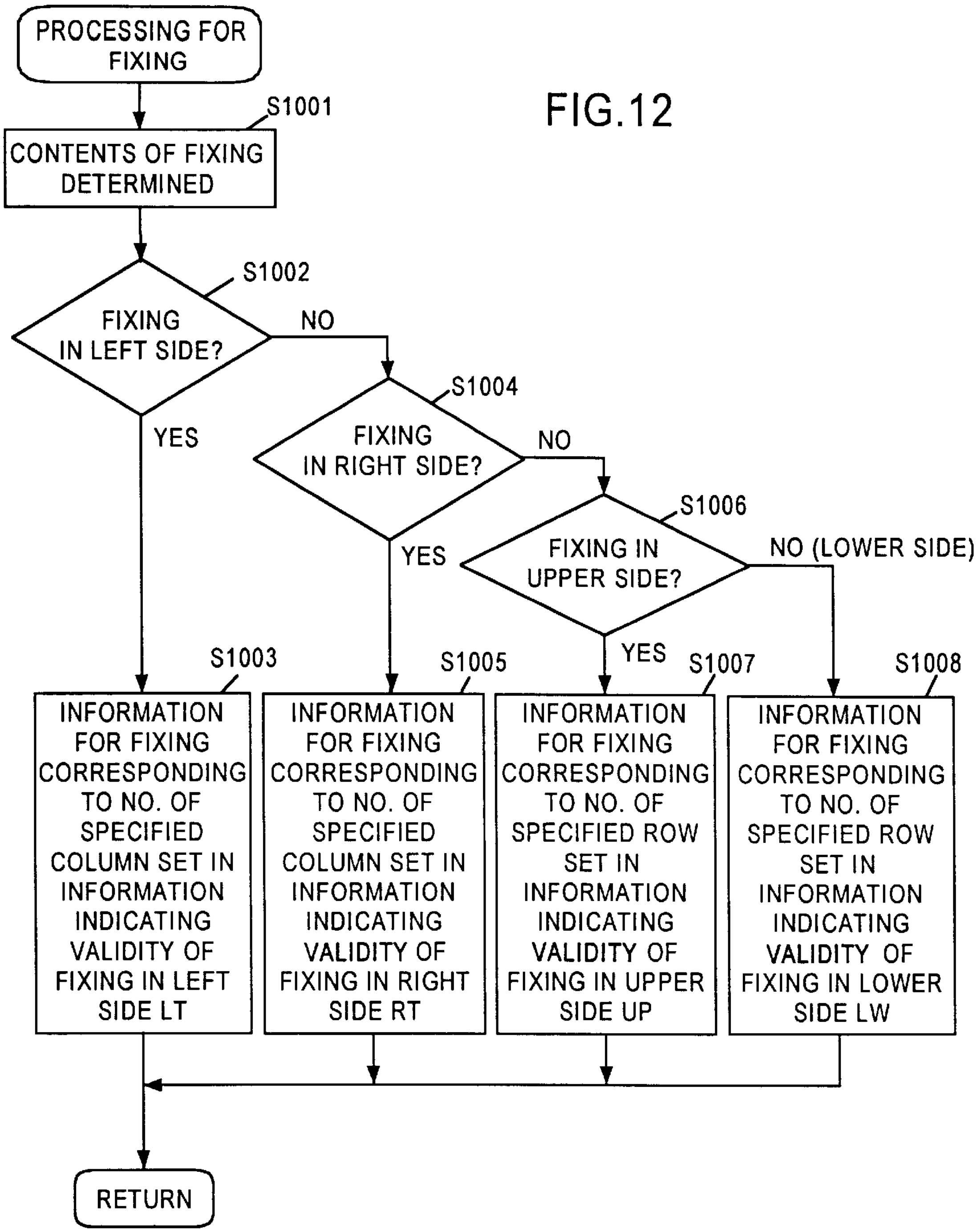
FIG. 12 is a flow chart explaining fixing processing in the processing for rows and columns.
Figure 13:
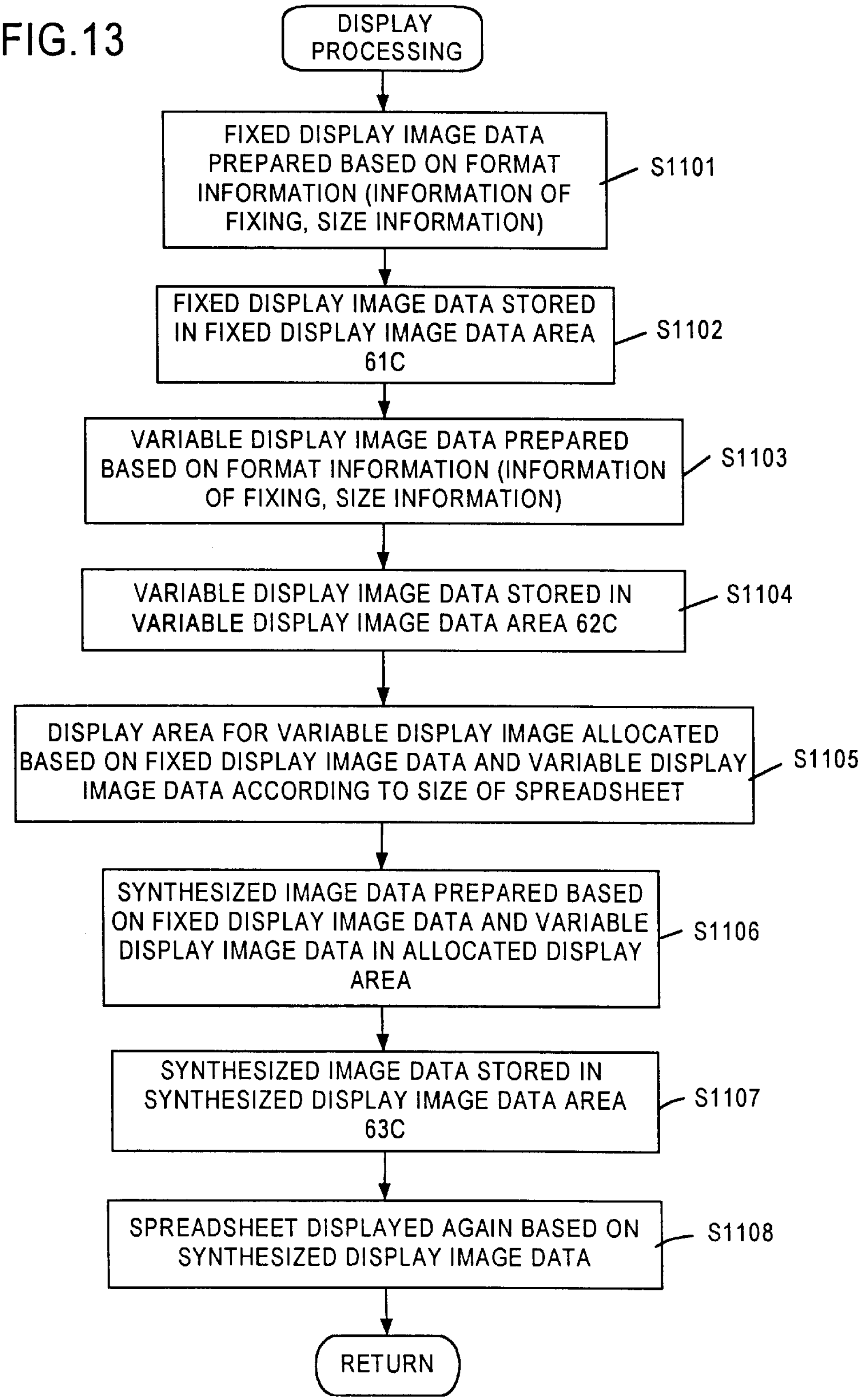
FIG. 13 is a flow chart explaining display processing in the processing for rows and columns.

FIG. 12 shows the operation of fixing, executed in response to the specification of fixing in the processing for rows and columns. FIG. 13 shows the operation of displaying the spreadsheet in relation to specification of the fixing in the processing for rows and columns.

Figure 14:
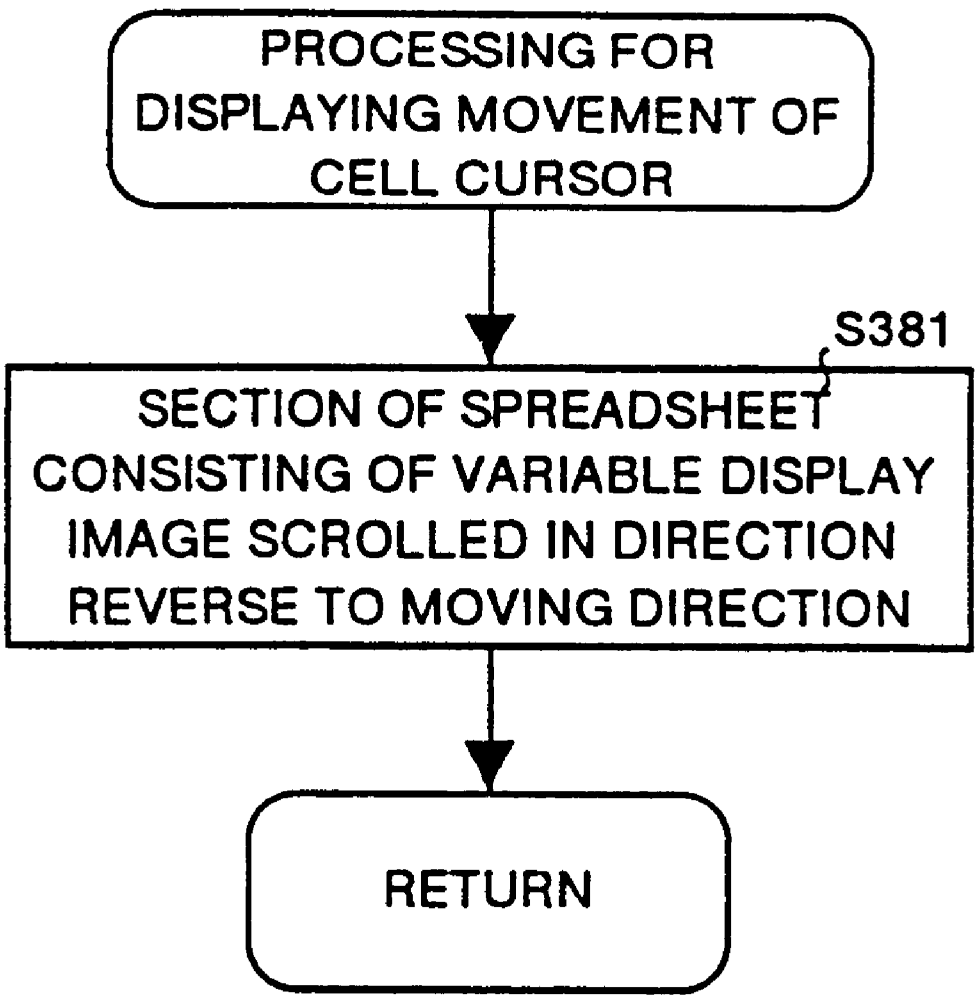
FIG. 14 is a flow chart explaining a cell cursor movement display processing in the processing for making a new spreadsheet.
Figure 22:
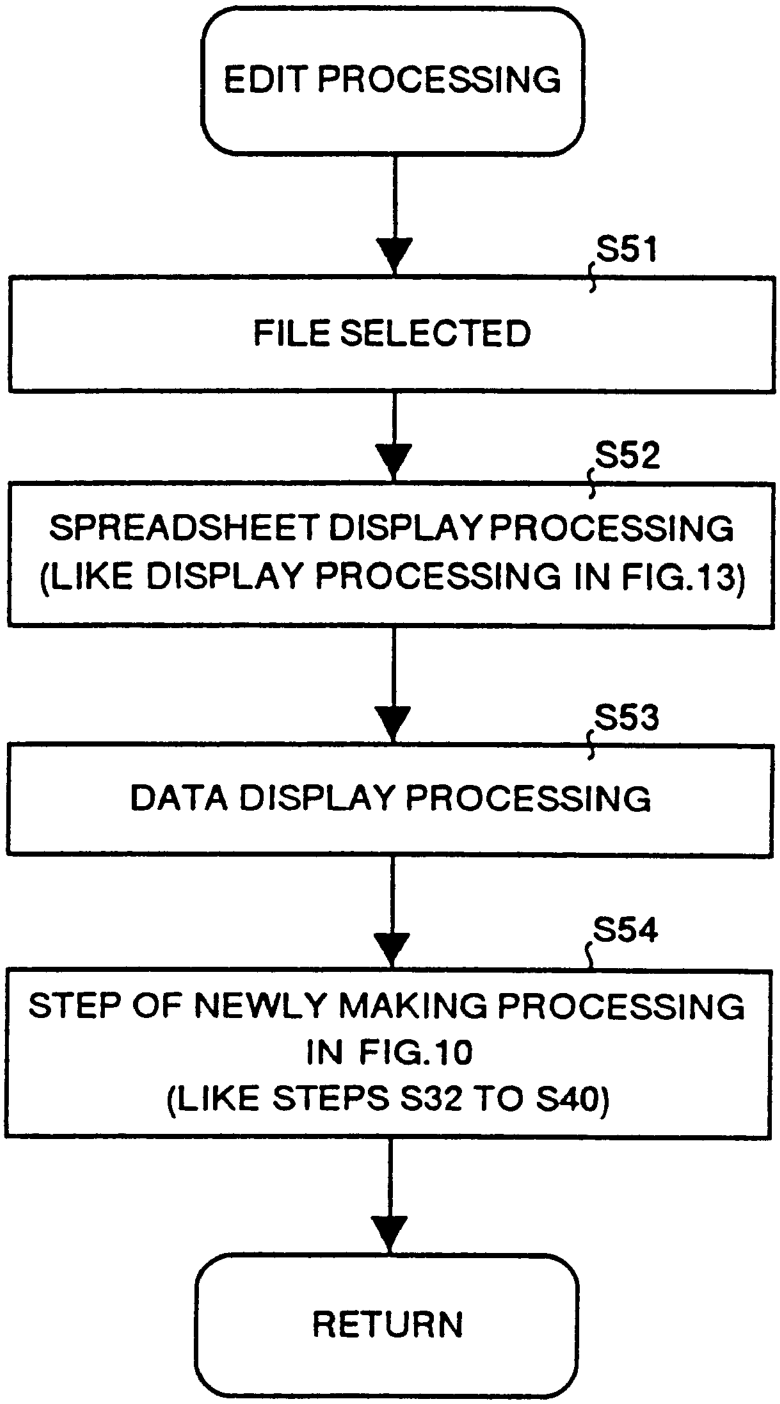
FIG. 22 is a flow chart explaining edit processing in a spreadsheet-calculating processing.

FIG. 14 shows the operation of displaying movement of a cell cursor, executed for controlling a display of a spreadsheet according to movement of the cell cursor. FIG. 22 shows the operation of editing a spreadsheet which has been prepared in the spreadsheet calculation processing.

The RAM 4 is a memory used as a work area for the CPU 1.

The spreadsheet calculation file storage section 5 is a memory for storing therein file data for the spreadsheet prepared during the operation of the spreadsheet calculation described above.

The spreadsheet calculation display data storage section 6 comprises a file data area 6A, a display range data area 6B, and a display data area 6C and stores therein display data required for the operation of spreadsheet calculation.

The file data area 6A is an area for storing therein cell information correlated to format information for each constituting a spreadsheet calculation file. The display range data area 6B is a memory for storing therein information for determining a cell to be displayed in the fixed state and cells to be displayed as variable according to a size of a display screen (a work area) of the display section 9. The display image data area 6C is a memory for developing therein display image data (bitmap data) based on the fixed cell information and the variable cell information.

The key entry section 7 has keys for characters, numerals, commands or the like and supplies key-entry signals detected in response to key operations to the CPU 1.

The pointing device 8 is an input device such as a mouse or the like for inputting a position or a range on the display screen.

The display section 9 is a display unit for displaying characters or images according to an operation with the key entry section 7 or the pointing device 8. This display section 9 displays an image based on display image data developed on the display image data area 6C of the spreadsheet calculation display data storage section 6, for instance, during the spreadsheet calculation.

The printing section 10 prints an output image such as the result of spreadsheet calculation or the like according to control by the CPU 1.

The external storage section 11 accepts a recording medium such as a magnetic recording medium, an optical recording medium, and a magneto-optical recording medium or the like detachably set therein to write data therein or read data therefrom.

The communicating section 12 connects a line LN to a communication network and executes data transaction through the network according to control by the CPU 1.

The internal bus section 3, to which each of the units described above is connected, transfers addresses, data, and control signals or the like thereto.

Next the main units are described.

At first the spreadsheet calculation file storage section 5 is described. FIG. 2 is a view of the contents stored in the spreadsheet calculation file storage section 5. The spreadsheet calculation file storage section 5 stores therein, as shown in FIG. 2, cell information CLL1, CLL2 . . . CLLn and format information FMT1, FMT2 . . . FMTn in correlation to file names FILE1, FILE2 . . . FILEn (n: a natural number) respectively.

Each file name FILE1, FILE2 . . . FILEn indicates a name of a file respectively, each cell information CLL1, CLL2 . . . CLLn indicates information for each cell in the corresponding file respectively, and each format information FMT1, FMT2 . . . FMTn indicates a format for forming a spreadsheet of the corresponding file respectively.

Further detailed description is made herein for the format information as well as the cell information.

The information for formats is first described. FIG. 3 is a diagrammatic view of a sample spreadsheet for explaining format information for the spreadsheet.

The spreadsheet comprises, as shown in FIG. 3, a plurality of cells arrayed in rows and columns. In FIG. 3, in the direction in which columns are arrayed (which may be referred to as a row direction), cells are counted as 11 columns in total from column labels A to K. In the direction in which rows are arrayed (which may be referred to as a column direction), cells are counted as 5 rows in total from row labels 1 to 5.

An address of each cell on a spreadsheet is identified by row and column labels. Namely, the address for a cell present on column A and row 1 is specified as “A1” on the spreadsheet. Similarly, the address for a cell present in column K and row 3 is specified as “K3” on the spreadsheet.

Also, on a spreadsheet, information for fixing cells and size information for the cell can be given to each row and each column as format information. The information for fixing cells is information for distinguishing a cell displayed in the fixed state from a cell in the variable state, while the size information is information indicating width and height of a cell with dimensions.

In FIG. 3, format information relating to a column (information for fixing and size information) is displayed in a form of information for fixing/size information bracketed in the right side of each of the column A to K. Format information related to a row (information for fixing and size information) is displayed in a form of information for fixing/size information bracketed in the right side of each of the row 1 to 5. It should be noted that, for a row, the height is appended to the size information and height information of each row is not displayed in the figure to simplify the description.

In FIG. 3, LT indicates the validity of fixing on the left side which permits fixing of a column (indicating the left column) in the array of columns. RT indicates the validity of fixing on the right side which permits fixing of a column (indicating the right column) in the array of the columns.

When information indicating the validity of fixing on the left side LT is specified, the columns located on the right side from the specified column are recognized as columns to be displayed in the variable state (variable display columns). Similarly, when information indicating the validity of fixing on the right side RT is specified, the columns located on the left side from the specified column are recognized as columns to be displayed in the variable state (variable display columns).

Also, UP indicates the validity of fixing on the upper side in which permits fixing of a row (upper row) in the array of the rows. LW indicates the validity of fixing on the lower side which validates fixing of a row (lower row) in the array of the rows.

When information indicating the validity of fixing on the upper side UP is specified, the rows located in the lower side from the specified row are recognized as rows to be displayed in the variable state (variable display rows). Similarly, when information indicating the validity of fixing on the lower side LW is specified, the rows located on the upper side from the specified row are recognized as rows to be displayed in the variable state (variable display rows).

IV indicates the invalidity of fixing in which does not permit fixing of both a row and a column. This information automatically allocated, when valid information for fixing is not specified, to any row or column.

In the example in FIG. 3, (LT/8) is added to the column A as format information. Thus, information indicating the validity of fixing on the left side LT is allocated to the column, and "8" is allocated thereto as width of each cell. This "8" indicates such scale data as 8 inches, 8 mm, or 8 as a ratio.

Added to the column K is (RT/10) as format information. Thus, information indicating the validity of fixing on the right side RT is allocated to the column, and "10" is allocated thereto as width of each cell.

Further, added to the columns B to J between the columns A and K is (IV/5) as format information. Thus, each information indicating the invalidity of fixing IV is allocated to each of the columns, and "5" is allocated thereto as width of each cell.

Added to the row number 1 is (UP) (originally described (UP/TY: indicating a representative height)) as format information. Thus, the information indicating the validity of fixing on the upper side UP is allocated to the row, and the representative height TY is allocated thereto as a height of each cell.

Also, added to the row number 5 is (LW) (originally described (LW/TY)) as format information. Thus, the information indicating the validity of fixing on the lower side LW is allocated to the row, and the representative height TY is allocated thereto as a height of each cell.

Further, added to the rows 2 to 4 between the rows 1 and 5 is (IV/TY) as format information. Thus, each information indicating the invalidity of fixing IV is allocated to each of the rows, and TY is allocated thereto as a representative height of each cell.

As described above, each cell has independent format information related to each direction of rows and columns respectively.

Next, cell information is described. FIG. 4 is a view showing an entire image of a spreadsheet for explaining the cell information for the spreadsheet.

The spreadsheet shown in FIG. 4 shows a plan for estimating attendance numbers for teams in a time span from 1990 to 1998 assuming that the current year is 1989. The spreadsheet shows an image under the assumption that the image of the entire spreadsheet according to the format information as shown in FIG. 3 can be displayed. However, the spreadsheet is not actually accommodated in the display screen of the display section 9.

The spreadsheet shown in FIG. 4 is in the state in which only the frame of a table in the spreadsheet has been prepared, with the cell information for the title items having been input thereinto. More specifically, for the frame, cells are partitioned into columns A to K in the horizontal direction and into rows 1 to 5 in the vertical direction according to the format shown in FIG. 3. For cell information, team names as title items are input in column A, and the years as title items are input in row 1.

Specified in column A and row 1 are, as shown in FIG. 3, the information indicating the validity of fixing in the left side LT and information indicating validity of fixing in the upper side UP. Thus, each title item in the columns and rows is not to be regarded as an object for scrolling, but as information to be always displayed.

In FIG. 4, the title item in the column A indicates a team name. Namely, cell data of "TEAM NAME" is stored in cell address A1, cell data "TM1", "TM2", "TM3" are stored at cell addresses A2 , A3 , A4 respectively, and cell data of "TOTAL" indicating a column of totals (total for each team and for the teams) is stored at cell address A5.

The title items in the row 1 are years. Namely, cell data of "'90" to "'98" for indicating the years in the ascending order is stored in the cell addresses B1 to J1. Cell data of "TOTAL" indicating a total column (the total for each team and for the teams) is stored in the cell address K1. It should be noted that the cell address K5 is a cell for storing therein values obtained by totalling the attendance number for the years and for each team.

As described above, cells for inputting thereto the title of item, each team name, and a total of the number of attendance in each year are set in the column A. Cells for inputting thereto each year and the total of the number of attendance for each team are set in the row number 1 (excluding the cell address A1).

Each cell at the cell addresses B2 to B4, C2 to C4 . . . J2 to J4 are where the number of attendance for each team in each year is input, thus they are the places dedicated for data input.

The total cell in column K and the total cell in row 5 are where a total of the attendance number for each team and a total thereof in each year are input respectively, as an expression for totalling the values is given to each cell in each total cell.

Then, in FIG. 3, the information for the validity of fixing on the right side RT and information for the validity of fixing on the lower side LW are specified in column K and row 5 respectively. Thus, cell data in each "total" cell in the columns and rows is not an object for scrolling but information which is always displayed.

Next more concrete description is made for contents of the cell information and format information described above.

Figure 5:
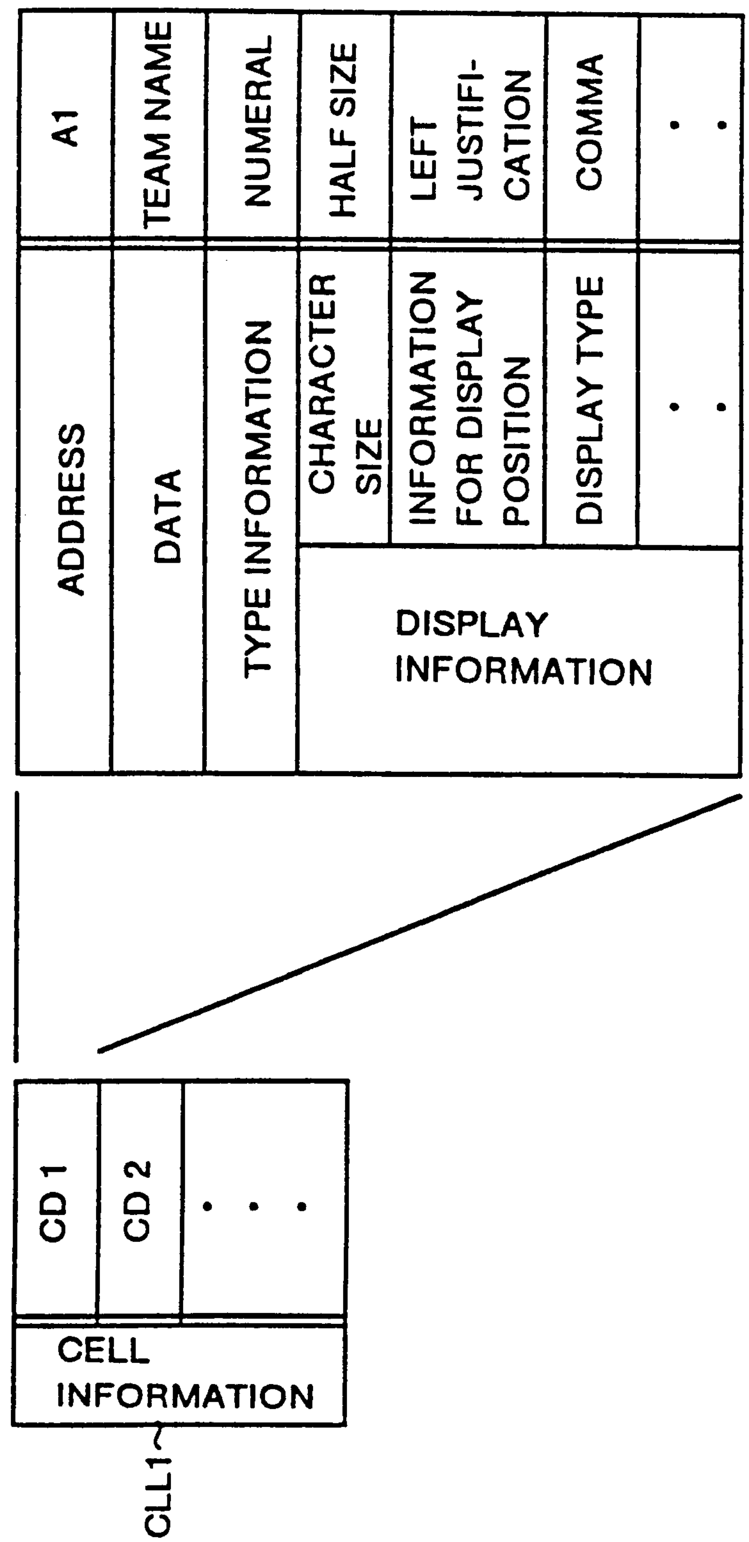
FIG. 5 is a view showing an example of data configuration of cell information.

At first, the cell information is described. FIG. 5 is a view showing a data configuration of the cell information.

FIG. 5 shows the cell information CLL1. This cell information CLL1 corresponds, as described above, to a file name FILE1 and comprises cell data CD1, CD2 . . . each corresponding to each cell.

Each of the cell data CD1, CD2 . . . comprises, as shown in FIG. 5, data in which an address indicating a place where a cell is located, data indicating display contents, type information indicating a type of the data, and display information comprising a character size, information for a display position, and information for a display type.

For instance, in a case of the cell data CD 1 (Refer to FIG. 4), the spreadsheet calculation file storage section 5 stores therein the address as "A1", data as "TEAM NAME", type information as "NUMERAL", character size as "HALF SIZE", information for a display position as "LEFT JUSTIFICATION", and display type as "COMMA".

Figures 6, 7:
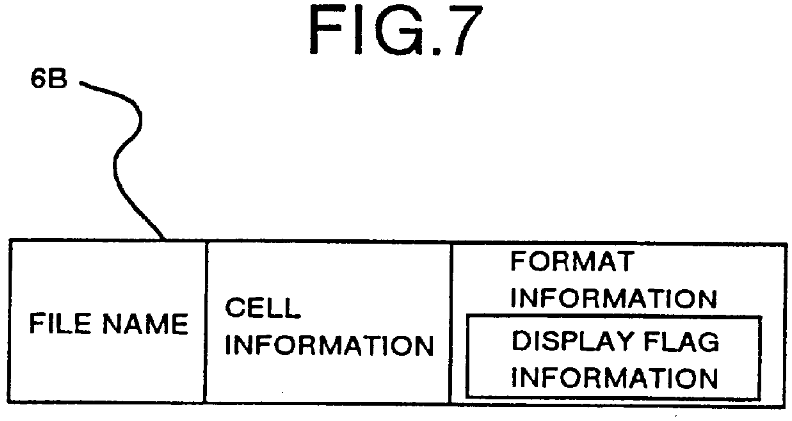
FIG. 6 is a view showing an example of data configuration of format information.
FIG. 7 is a view showing an example of data configuration of a display range data area.

Next format information is described. FIG. 6 is a view showing a data configuration of the format information.

FIG. 6 shows file information FMT1. This format information FMT1 corresponds, as described above, to the file name FILE1 and comprises data in which information for fixing and size information are correlated to each column and each row.

The data configuration in the format information is as described above with reference to FIG. 3. The spreadsheet calculation file storage section 5 stores therein, for instance, the information for fixing as "LT" (information indicating validity of fixing in the left side) and size information, namely information for width as "8" each for the column number A.

The table frame of a spreadsheet is prepared according to the above format information, and data is displayed in each cell according to the cell information.

Next detailed description is made for the spreadsheet calculation display data storage section 6.

A file data area 6A is an area for storing therein the same data as the file name FILE, cell information CLL, format information FMT each stored in the spreadsheet calculation file storage section 5 as file data. This file data area 6A is used for detecting data in the updated state at the time of storing the data in the spreadsheet calculation file storage section 5 or in the external storage section 11.

At first a display range data area 6B is described. FIG. 7 is a view showing data configuration of the display range data area 6B.

The display range data area 6B stores therein, as shown in FIG. 7, cell information and format information corresponding to a file name.

Each file name, cell information and format information stored in the display range data area 6B has the same data configuration as that for the file name, cell information, and in the format information each described with reference to FIG. 2 respectively.

The data stored in the spreadsheet calculation file storage section 5 is constant data. In contrast, the data to be stored in the display range data area 6B is different therefrom in that it is dynamic. Thus, information for a display flag is added to the display range data area 6B.

This information for a display flag is set in correlation to rows and columns displayable on a display screen in the display section 9 in variable display rows and variable display columns within the format information. For instance, a flag "1" is set in variable display rows and variable display columns which are displayable, and a flag "0" is set in the variable display rows and variable display columns which are not displayable.

Herein, displayable variable display rows and variable display columns indicate rows and columns within a display range. Indisplayable variable display rows and variable display columns indicate rows and columns outside the display range.

Figure 8:
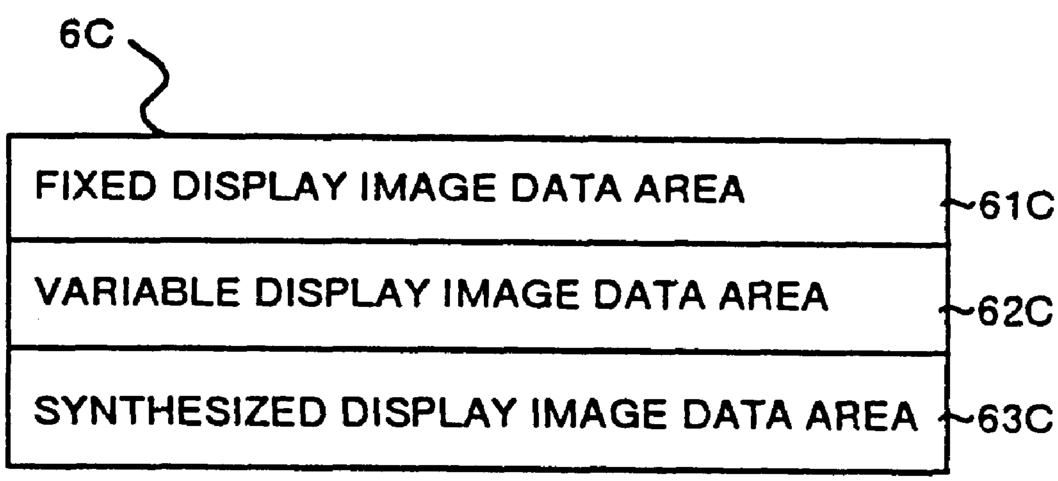
FIG. 8 is a view showing an example of data configuration of a display image data area.

Next a display image data area 6C is described. FIG. 8 is a view showing data configuration of the display image data area 6C.

The display image data area 6C comprises, as shown in FIG. 8, a fixed display image data area 61C, a variable display image data area 62C, and a synthesized display image data area 63C.

The fixed display image data area 61C is an area for developing therein display image data (fixed display image data) for a fixed display column and a fixed display row set in the display range data area 6B. The variable display image data area 62C is an area for developing therein display image data (variable display image data) for rows and columns each in which a flag "1" is set according to display flag information in the variable display columns and variable display rows set in the display range data area 6B.

The synthesized display image data area 63C is an area for developing therein synthesized image data constituting one sheet of spreadsheet obtained by synthesizing the fixed display image data developed in the fixed display image data area 61C with the variable display image data developed in the variable display image data area 62C.

Next description is made for operations. FIG. 9 is a flow chart explaining the operation of spreadsheet calculation. FIG. 10 is a flow chart explaining the operation of making a new file in the spreadsheet calculation processing. FIG. 11 is a flow chart explaining the operation of rows and columns in the processing for making a new file. FIG. 12 is a flow chart explaining the operation of fixing in the processing for rows and columns. FIG. 13 is a flow chart explaining the operation of the display processing of rows and columns. FIG. 14 is a flow chart explaining the operation of displaying movement of a cell cursor in the processing for making a new file. FIG. 15 to FIG. 21 are views each showing a display of a spreadsheet during the operation of making a new file. FIG. 22 is a flow chart explaining the operation of edit processing in the spreadsheet calculation processing.

At first, the operation of spreadsheet calculation processing is described.

When the apparatus is already in the mode of spreadsheet calculation processing, alternatives such as creating a new file and editing an old file or the like are displayed on the display screen of the display section 9 for the spreadsheet calculation processing.

When a processing is selected from the display screen according to an operation of the key entry section 7 or the pointing device 8 (step S1), the selection is determined in step S2 and step S4.

When it is determined that the processing for creating a new spreadsheet has been selected in step S2, system control branches to step S3, and the processing for creating a new spreadsheet is carried out. Then, if the operation for terminating processing is not detected in step S7, system control returns again to step S1 and processing is continued until the operation for terminating processing is detected.

When it is determined that edit processing has been selected in step S4, system control branches to step S5, and processing for editing is carried out. Then, if an operation for terminating processing is not detected in step S7, system control returns again to step S1 and processing is continued until the operation for terminating processing is detected.

When it is determined that none of the processing has been selected in step S4 and step 4, system control branches to step S6, and other processing is carried out according to the processing selected in step S1. Then, if an operation for terminating processing is not detected in step S7, system control returns again to step S1 and, if the operation for terminating is detected, the processing is terminated.

Next description is made more specifically for each processing in the spreadsheet calculation processing.

At first, the processing for creating a new spreadsheet is described.

When system control proceeds to the processing for creating a new spreadsheet, at first, a table frame for a basic spreadsheet is displayed in step S31. In this step, all the cells in the spreadsheet are uniform in size according to a standard value, each row is a variable display row, and each column is a variable display column.

Hereinafter the operation is described for initializing a spreadsheet having the cell information and format information as shown in FIG. 4.

In this operation, at first a title item for the spreadsheet is input.

In this case, processing for moving a cell cursor to a required cell position is first carried out according to an operation of the key entry section 7 or the pointing device 8.

At first an operation of the key entry section 7 or the pointing device 8 is detected in step S32. Then, it is determined in step S37 that the cell cursor is to be moved, and system control branches to the processing for displaying movement of a cell cursor in step S38. The processing for displaying movement of a cell cursor is described later in detail.

As described above, after the processing for displaying the movement of a cell cursor is finished, and if an operation for terminating processing is not detected in step S40, the processing returns back to step S32.

Then, data input is carried out to a position of a cell cursor according to an operation in the key entry section 7 or the pointing device 8.

At first an operation of the key entry section 7 or the pointing device 8 is detected in step S32. Then, it is determined that data is input at a position of the cell cursor, displayed according to the processing for displaying movement of the cell cursor in step S35. Accordingly, system control branches to the processing for displaying the input data in step S36.

Then, to format the spreadsheet, width and height of a cell are set in each row. Herein, it is assumed that a default value TY is used for the height of a cell, so that only the width of a cell is set in this step.

At first the cell cursor is moved to a position of any column or row according to an operation of the key entry section 7 or the pointing device 8, and processing for specifying a column or row as an object is carried out at the cursor position.

At first an operation of the key entry section 7 or the pointing device 8 is detected in step S32. Then, it is determined in step S37 that the cell cursor is to be moved, and system control branches to processing for displaying the movement of a cell cursor in step S38. The processing for displaying the movement of a cell cursor is described later in detail.

As described above, after the processing for displaying the movement of a cell cursor is finished, and if an operation for terminating processing is not detected in step S40, the processing returns back to step S32.

When the cell cursor is moved to a position of any column or row according to the same operation as described above, it is determined that an operation was executed in step S32. Namely, the operation for specifying any row and column is recognized in step S33, and the processing for rows and columns in step S34 is executed. This processing for rows and columns is also described later in detail.

When the width of a cell in each column and height of a cell in each row are set as described above, a display size of the spreadsheet is changed according to the cell width as well as to the cell height.

It should be noted that, when the operation detected in step S32 does not correspond to any of the operations for specifying rows/columns, data input, and for moving the cell cursor, system control branches to step S39, and the other processing is executed according to the input operation. After this step, system control proceeds to step S40.

Included in the other processing is specification of storing a created spreadsheet, and when the storage is specified, the processing for registering the data for the spreadsheet in the spreadsheet calculation file storage section 5 in correlation to the file name, cell information, and format information stored in the display range data area 6B is carried out.

It should be noted that, when an operation for terminating processing is executed in step S32, system control passes through step S39, and termination of processing is checked in step S40.

Next description is made for each processing in the processing for creating a new spreadsheet.

At first, processing for rows and columns is described.

When system control branches from the processing for making a new spreadsheet to the processing for rows and columns shown in FIG. 11, operational input to the position of the cell cursor is detected first in step S41.

As described above, when the operation for inputting data for width and height of a cell is executed, a parameter to any row or column on which the cell cursor is displayed is inputted in step S341. For instance, in a case of the column A, the parameter of “8” is input thereto.

Accordingly, in step S345, it is determined whether an operation for specifying width of a cell is executed or not, and then in step S346, the input parameter of “8” is applied to size information. As a result, the width of a cell in the column A on the display is changed from the default size to the size corresponding to the parameter of “8”.

It should be noted that, as an operation for specifying height of a cell is also executed according to the same processing sequence, so that description thereof is omitted herein.

It is possible to obtain cell width and cell height each constituting the format information shown in FIG. 4 according to the same processing sequence.

For instance, when the cell cursor is present at column A, the cells in column A is the column to be displayed in the fixed state, and the screen display is in the state shown in FIG. 15, it is necessary to execute an operation for selecting validity of fixing on the left side or validity of fixing on the right side by specifying either one.

For column A, as shown in FIG. 4, a title item is to be set in the column. Thus, an operation for fixing the column as a title column is carried out. Namely, in step S341, an operation for specifying validity of fixing in the left side is executed, so that this operation is confirmed in step S342.

Then, system control branches to step S343, and the processing for fixing according to specification of validity of fixing in the left side is executed. Then system control proceeds to step S344, displaying according to the result of carrying out the processing for fixing. After the step, system control returns to the processing for creating a new spreadsheet.

Similarly, also for row 1 or row 5, specification of validity of fixing on the spreadsheet shown in FIG. 5 can be executed.

In this processing for rows and columns, other processing such as addition, insertion, or deletion of rows and columns can be executed when any of the processing described above is specified, the processing is carried out in step S347. After the step, system control returns to the processing for creating a new spreadsheet.

Next, specifically the processing for fixing is described.

In the processing for fixing, at first, in step S1001, determination is made as to which one of the validity of fixing on the light side, the validity of fixing on the right side, the validity of fixing on the upper side, and the validity of fixing on the lower side the specified contents of fixing corresponds to.

In the example shown in FIG. 15, the validity of fixing on the left side is specified for the column A, the validity of fixing in the upper side is specified for the row 1, and validity of fixing in the lower side is specified for the row 5. It should be noted that a display size of the spreadsheet on the display section 9 is assumed to be the size shown in FIG. 15 as one of the examples. For this reason, if it is determined in step S1001 that validity of fixing on the left side is selected, system control branches via step S1002 to step S1003. If it is determined in the step that the validity of fixing on the upper side is specified, system control branches via step S1006 to step S1007. Also if it is determined in the step that the validity of fixing on the lower side is specified, system control branches via step 1006 to step S1008.

Where system control branches to step S1003, information indicating the validity of fixing on the left side LT is set as information for fixing the column A. Also, where system control branches to step S1007, information indicating validity of fixing on the upper side UP is set as information for fixing the row 1. Where system control branches to step S1008, information indicating the validity of fixing on the lower side LW is set as information for fixing the row 5.

As described above, when the processing for fixing is executed, any row or column, for which information indicating the invalidity of fixing IV had been set, becomes items to be always displayed in the spreadsheet on the display screen.

It is needless to say that, with the spreadsheet shown in FIG. 4, the column K is a column as an object to be fixed, so that information indicating the validity of fixing in the right side RT is set in this column K. This processing for setting is performed via S1004 in step S1005.

After the processing for fixing is executed, system control proceeds to the display processing. Thus, display processing, in relation to the processing for fixing is described.

In the display processing, at first in step S1101, fixed display image data is prepared according to the format information (information for fixing, size information) set in the fixing processing.

The fixed display image data prepared in step S1101 is stored in the fixed display image data area 61C in step S1102.

Then, in step S1103, variable display image data is prepared according to the format information (information for fixing, size information) set in the fixing processing.

The variable display image data prepared in step S1103 is stored in the variable display image data area 62C in step S1104.

Then, in step S1105, a computing operation is executed to incorporate the variable display image in the display area obtained when fixed display image comprising fixed display rows and fixed display columns is incorporated in the fixed state in the spreadsheet on the display screen.

Namely, the display area is an area computed from the size of the spreadsheet which can be displayed at once on the display screen as well as from the location of the fixed display image and the size thereof. After this display area is obtained, a display range is computed for a variable display image to be incorporated in the display area.

Then, in step S1106, the fixed display image data stored in the fixed display image data area 61C is read, and processing for preparing fixed display image data is executed according to the fixed display image data as well as to the data (a portion of the variable display image data) in the display range of the variable display image.

In step S1107, this synthesized display image data is stored in the synthesized image data area 63C.

Then, in step S1108, by displaying the spreadsheet based on the synthesized display image data stored in the synthesized image data area 63C, row 1, row 5 and column A, which had been the variable display rows and the variable display column respectively, are displayed in the fixed state even when an operation for scrolling the variable display image is executed thereafter.

In the display obtained in step S1108, cells on the fixed display column and cells on the fixed display rows are, as shown in FIG. 15, displayed in reversed state (shaded sections in FIG. 15). For this reason, specification as to which of the cells is to be fixed can easily be inspected.

Now, when the cell cursor is moved to the column K according to the above operation and the validity of fixing on the right side therefrom is to be specified, the cell cursor is moved from the state shown in FIG. 15 in the right direction so that a display state shown in FIG. 16 is obtained.

Then, as described in detail with reference to FIG. 11 and FIG. 12, for the processing for fixing, the validity of fixing on the right side is specified for column K. The cells on column K are displayed in reversed state through the display processing as shown in FIG. 16.

When the display contents are again changed from the state shown in FIG. 16 to the display contents near the header columns, the operation can be executed with the cell cursor.

Detailed description is made for the processing for displaying cell cursor movement with reference to an example.

To obtain a display state in the header column side shown in FIG. 17 from that in the end column side shown in FIG. 16, as one of the examples, it is required to move the cell cursor to either a cell on column H or to any cell position in column H.

In this case, the variable display columns may be moved in the right direction with the pointing device 8 by applying the known scrolling technology. In the step, a variable display image as an object for scrolling is a variable display image in a range from the column B to J present between column A and column K because both column A and K are fixed display images.

As described above, in the scrolling technology, variable display images can freely be moved in the row and column directions without using the cell cursor, but in Embodiment 1, scrolling can be executed with operation of a cursor key provided in the key entry section 7.

In the scrolling operation as described above, as shown in step S381, the spreadsheet changes the contents thereof so that the variable display images can be scrolled in the reverse direction to the moving direction specified to the cell cursor.

Any data and operational expressions can be input in each cell with the scrolling technology as described above.

For instance, when any data or an operational expression is input in each cell from the display state shown in FIG. 17, as shown in FIG. 18, a numerical value based on the input data and a total value based on the input operational expression are obtained in each cell respectively.

As shown in FIG. 18, when data is also input in a column on the header side, the total for the cells in column K, which can always be referred to as the total column. Thus, appropriate data can be input thereto while referring to the total on the same screen. Similarly, as shown in FIG. 19, data can successively be input while the variable display image is being scrolled to the end, during which the total of cells in column K, which can always be referred to as the total column.

In the spreadsheet according to the present invention, any column or row may be inserted after the validity of fixing is specified.

For instance, when one team is to be added thereto in 1994, columns up to column F are displayed by scrolling by one from the display state shown in FIG. 19. Cells for one row are added to the position of row 5. In accordance with this operation, the total row at the lower edge lowers its row label by one and the row label is changed to 6.

In this step, if there is any space in the display area in the row direction, as shown in FIG. 20, the row for the total is shifted to one stage downward in the display position.

Correction of an attendance number is directly reflected in the corresponding total cell. Namely, in FIG. 20, team TM2 estimates 3,400 people in '94 (cell address F3), but, when the number is corrected to 5,500 people as shown in FIG. 21, the total of attendance for team TM2 changes from 12,400 people to 14,500 people.

Description is further made for edit processing in the spreadsheet calculation processing. This edit processing is similar to the processing for creating a new spreadsheet in the entire processing flow, and for this reason, description is made herein mainly for the difference therebetween.

In the edit processing, as shown in FIG. 22, any file is first selected in step S51.

To be more specific, file retrieval is carried out from the spreadsheet calculation file storage section 5, files names FILE1, FILE2 . . . of the detected files are read, and processing for displaying the read file names on the display screen is performed.

Then, when one of the files names is selected through operation with the key entry section 7 or pointing device 8, the cell information and format information for the selected file name are further read from the spreadsheet calculation file storage section 5 and stored in the file data area 6A.

As described above, when each data is stored in the file data area 6A, the same data as the originally stored data is stored in the display range data area 6B. Then, display flags for each row and each column constituting a variable display image are set according to the size of the spreadsheet and information for fixing.

Then, in step S52, the same display processing as that in the processing for creating a new spreadsheet (Refer to FIG. 13) is performed, and a synthesized display image comprising a fixed display and variable display images is formed in a spreadsheet on the display screen.

Then, system control proceeds to step S53, and the processing for data display based on the cell information is carried out. As a result, a numerical value and total or the like are displayed in each cell.

After the step, the same processing as that in the processing for creating a new spreadsheet in step S32 to step S40 is executed (Refer to FIG. 10).

As described above, with Embodiment 1, any arbitrary row and column are displayed in the fixed state, so that rows and columns other than titles like cells for results of computation therein can always be referred to without scrolling. As a result, it is possible to improve the general operability at the time of spreadsheet initialization.

Also, a display area for a variable display image is allocated according to a relationship between the size of a fixed display image and the size of the spreadsheet displayed on the display screen. Thus, any row and column to be displayed in the fixed state or a combination of the row and column can preferentially be displayed regardless of a size of the display screen.

Although a specific method of computing a size of a variable display image was not described in Embodiment 1 above, a display range of a variable display image may be decided by adjusting the size of a variable display row or a variable display column adjoining a fixed display row or a fixed display column like in Embodiment 2 of the present invention as described hereinafter.

It should be noted that, as Embodiment 2 has the configuration shown in FIG. 1 like Embodiment 1 of the present invention described above, illustration of Embodiment 2 and description of each unit are omitted herein and the same reference numerals as those shown in FIG. 1 are used for each unit in the following description.

So herein only operations different from those in Embodiment 1 are described. FIG. 23 is a diagrammatic view showing an example of a spreadsheet for explaining format information of the spreadsheet. The following description assumes a spreadsheet consisting of row A to K and column 1 to 16.

Figure 24:
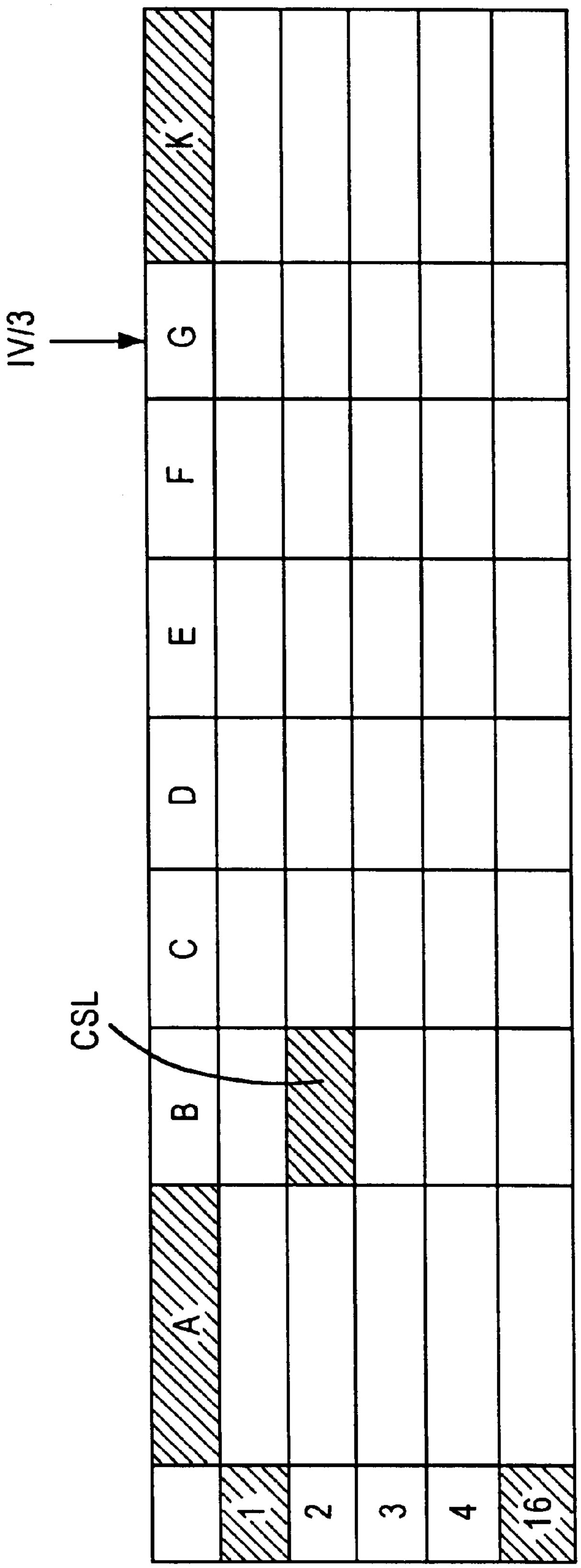
FIG. 24 is a view showing an example of the display of a spreadsheet in display processing according to Embodiment 2.
Figure 25:
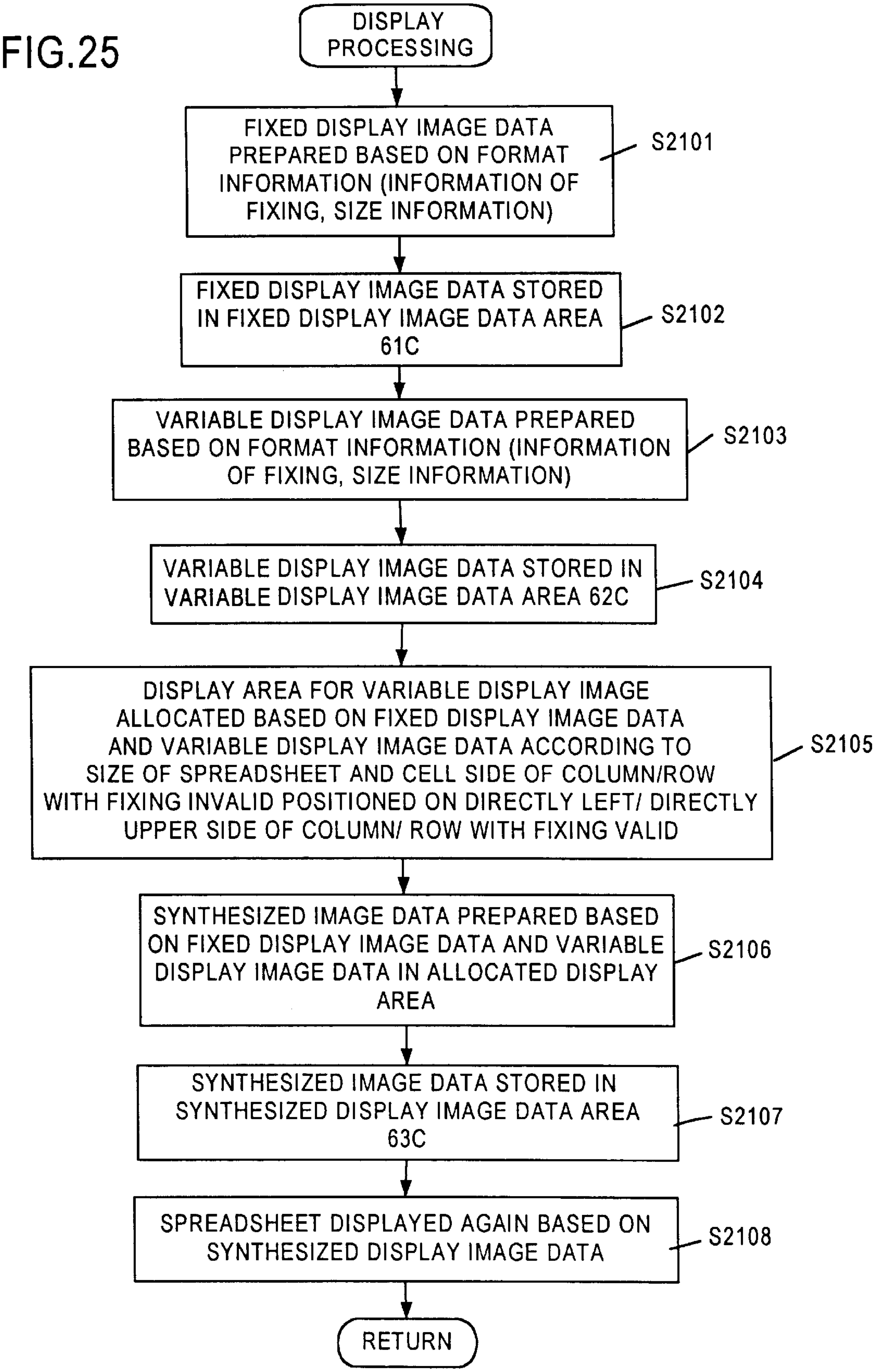
FIG. 25 is a flow chart explaining the displaying processing according to Embodiment 2.
Figure 26:
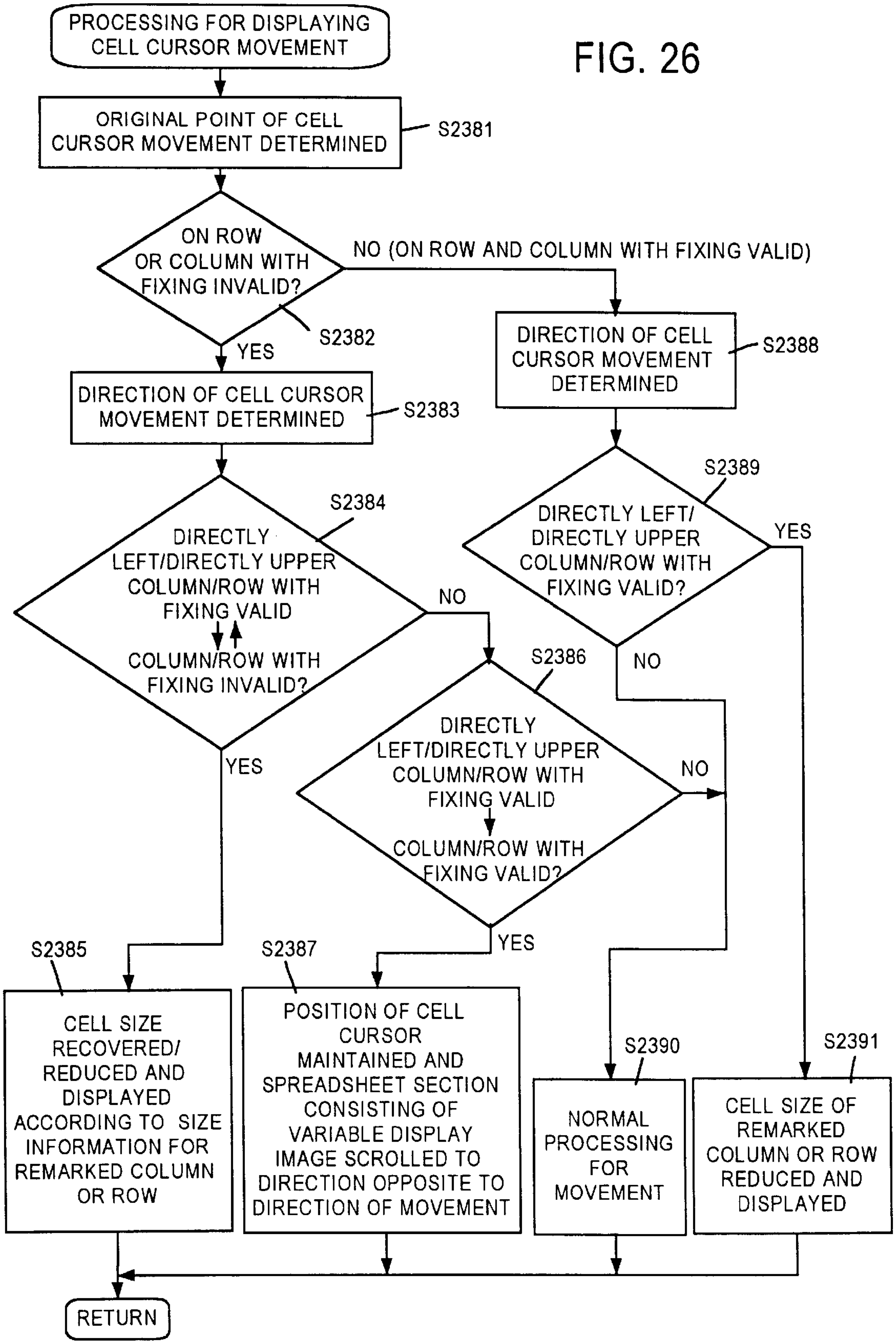
FIG. 26 is a flow chart explaining processing for displaying cell cursor movement according to Embodiment 2.
Figure 27:
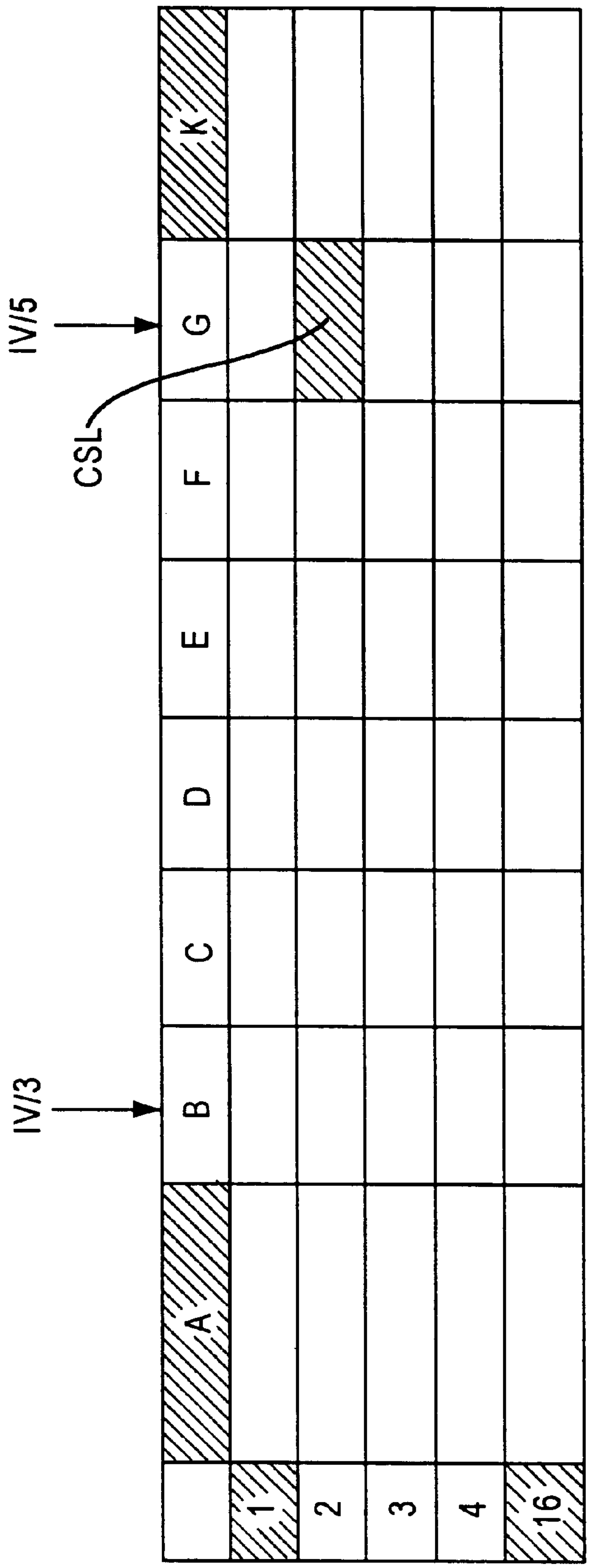
FIG. 27 is a view showing an example of display of a spreadsheet in the processing for displaying cell cursor movement according to Embodiment 2.

FIG. 24 is a view showing an example of display of a spreadsheet display processing according to Embodiment 2. FIG. 25 is a flow chart illustrating the display processing according to Embodiment 2. FIG. 26 is a flow chart illustrating processing for cell cursor movement display according to Embodiment 2. FIG. 27 is a view illustrating an example of display of a spreadsheet in the cell cursor movement display processing in Embodiment 2.

A display processing is described.

In the display processing, at first in step S2101, fixed display image data is prepared according to format information (information for fixing, size information) set through the fixing processing.

The fixed display image data prepared in this step S2101 is stored in a fixed display image data area 61C in step S2102.

In step S2103, variable display image data is prepared according to the format information (information for fixing, size information) set through the fixing processing.

The variable display image data prepared in this step S2103 is stored in a variable display image data area 62C in step S2104.

In step S2105, a computing operation is executed for incorporating a variable display image in a display area obtained when a fixed display image comprising a fixed display row or a fixed display column is incorporated in a spreadsheet on the display screen.

In this Embodiment 2, the display size of a spreadsheet is fixed. Thus, portion of a cell may overflow a display range when a display range for a variable display image is computed from the display area obtained in the computing operation described above.

For instance, when a portion of a variable display column adjoining a fixed display column overflows, operation is executed for adjusting a size of the entire display range by reducing a cell width of the adjoining variable display column.

FIG. 24 shows an example thereof. In FIG. 24, at present, a cell cursor CSL is positioned at cell address B2, and FIG.

24 shows a state where a cell width of a variable display column with the column G, directly adjoining a fixed display column, with the column K on the left side thereof has been reduced. In this case, as an example, as indicated by an arrow mark, the cell width has been reduced and changed from parameter "5" to parameter "3". It should be noted that the arrow mark and IV/3 are not actually displayed.

In this stage, the cell cursor CSL has not been moved to the column G, and it is not necessary to refer to the column G on the spreadsheet. Thus, no problem occurs even if each cell in the column G is displayed with a reduced size.

In step S2106, the fixed display image data stored in the fixed display image data area 61C is read, and processing is executed for preparing fixed display image data according to this fixed display image data as well as to data for a display range of the variable display image described above (a portion of variable display image data).

In step S2107, the synthesized image data is stored in a synthesized image data area 63C.

In step S2108, by having displayed a spreadsheet based on the synthesized display image data stored in the synthesized image data area 63C, it is possible to display the row 1, row 5 or column A, each of which had been a variable display row or a variable display column, in the fixed state even if an operation is executed for scrolling the subsequent variable display images.

It should be noted that, when a scrolling operation is executed upon a column like column 5 which is currently being displayed with a reduced size, the cell width of a column replaced at the current position of column G is displayed with reduced size. Namely, the cell width of a column directly adjoining the column K on its left side is unconditionally displayed with a reduced size.

Next, the processing for displaying cell cursor movement is described.

When an operation for moving the cell cursor CSL is executed, at first in step S2381, determination is made as to whether an original point from which the cell cursor has moved is fixed or not.

In the state of the cell cursor CSL shown in FIG. 24, the result of determination indicates that the cell cursor is on a row or a column for which fixing is invalid, and system control branches to step S2383.

For instance, when an operation for moving the cell cursor CSL from address B2 (Refer to FIG. 24) to address G2 is executed, it can be considered that movement of the cell cursor is executed by any of the following two methods.

One method is to directly specify the address G2 by using a pointing device 8, and in this case, as it has been confirmed that the cell cursor CSL directly jumps from a column on which fixing is invalid to a left-side adjoining column on which fixing is valid with one operation in step S2384, system control branches to step S2385.

Another method is to specify the address G2 using a cursor key in the key input section 7 and successively the cursor from column to column, and in the routes of address B2 to C2, C2 to D2, D2 to E2, and E2 to F2, normal cell cursor movement is executed, so that system control does not branch from step S2384 to step S2385, nor from step S2386 to step S2387, but branches to step S2390 to execute processing for normal cursor movement.

When an operation is executed for moving the cell cursor from address F2 to address G2, it is confirmed that the cell cursor moves from a column on which fixing is invalid to a left-side adjoining column on which fixing is valid in step S2384, and system control branches to step S2385.

And in step S2385, at first size information is read for a selected cell (a cell at address G2 in this case) which is the destination for movement. In this case as the cell width parameter is "5", processing is executed for recovering the cell width "3" currently used for compressed display to the original cell width of "5".

Further in this step S2385, taking into consideration the fact that, when cell width at address G2 is recovered to the original width, a display range for a variable display image is enlarged, an operation is executed to reduce the cell width of a variable display column at a left edge opposite to a cell at address G2 at a right edge, namely column B.

Although the cell width of this column B is normally "5", since the width of the entire display range has increased by parameter "2", the cell width "5" is reduced to "3".

As a result, as shown in FIG. 27, the cell cursor CSL moves to column G with cell width of column G restored to the original size of "5". The cell width of column B opposite thereto is reduced to "3" because importance of column B for reference on the spreadsheet decreases in this stage.

It should be noted that the operation for reducing the cell size may be executed for a variable display row adjoining a fixed display row.

As described above, with Embodiment 2 of the present invention, the display size of a variable display column or the variable display row adjoining a fixed display column or a fixed display row respectively can be reduced so that the column or row can be accommodated within a display range. When the reduced column or row is specified, the display size can be restored to the original size and the display size of other columns or rows within the display range can be reduced. Thus, unless a variable display column or a variable display row displayed at a position adjoining a fixed display column or a fixed display row is specified as an object for an operation such as input of data or an operational expression, there is an advantage that it is only required to maintain a required and minimum display size for the column or row according to a size of the display range.

As in the application of Embodiment 1 or Embodiment 2 of the present invention as described above, for Embodiment 3 of the present invention as described below, when data not accommodated in one cell on a spreadsheet is present, the remaining data may be displayed in an empty cell adjoining the cell above.

It should be noted that, as this Embodiment 3 has the same configuration as shown in FIG. 1 like Embodiment 1 described above, illustration of the configuration and description of each unit are omitted herein, and the same reference numerals as that in FIG. 1 are used for each unit.

Figure 29:
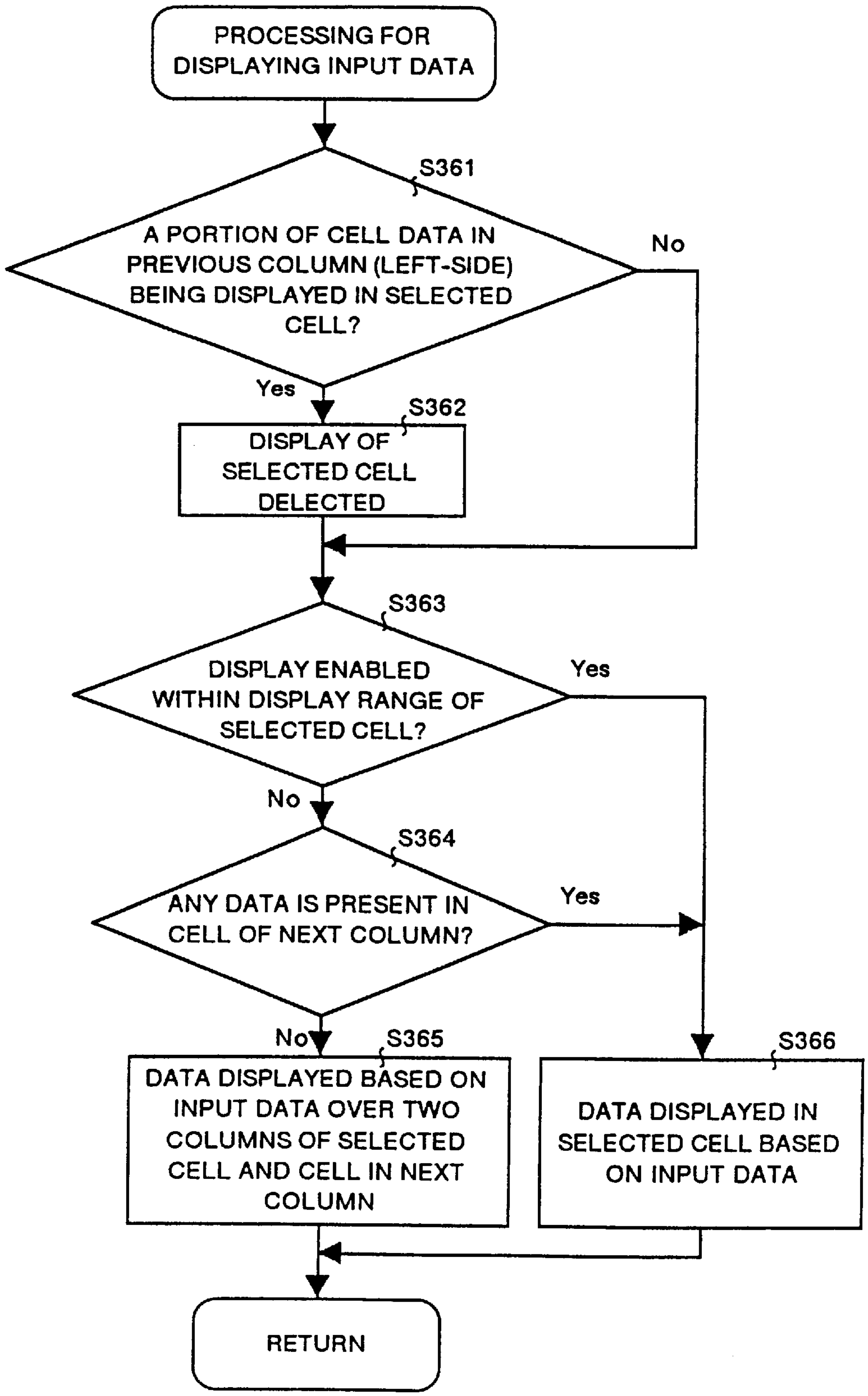
FIG. 29 is a flow chart explaining processing for displaying input data according to Embodiment 3.
Figure 30:
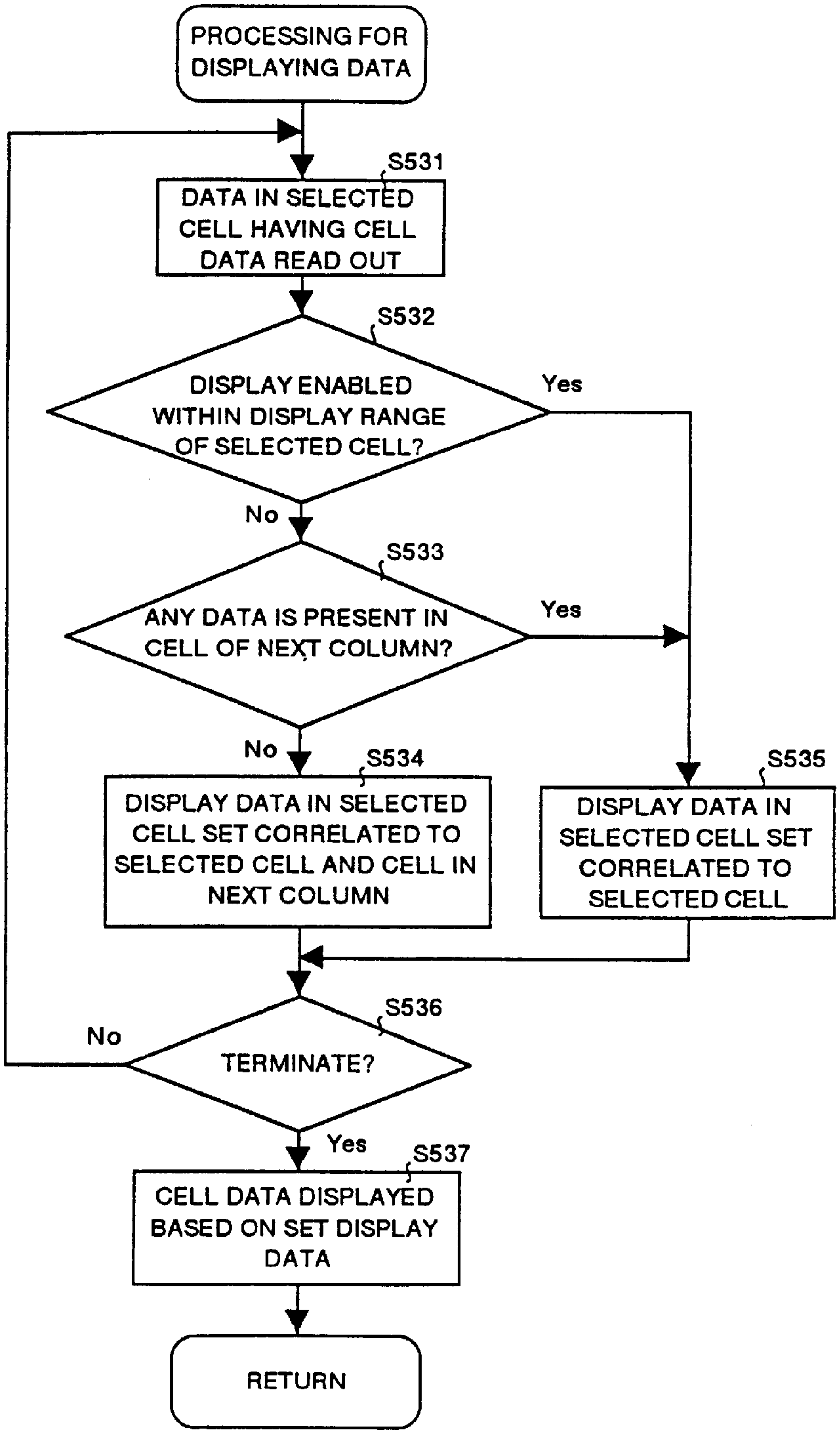
FIG. 30 is a flow chart explaining the processing for displaying data according to Embodiment 3.

For this reason, herein only those operations different from those in Embodiment 1 described above are described. FIG. 28 is a view showing an example of display of a spreadsheet when input data is displayed or when data is displayed in Embodiment 3. FIG. 29 is a flow chart illustrating processing for displaying input data according to Embodiment 3. FIG. 30 is a flow chart illustrating processing for displaying data according to Embodiment 3.

At first, description is made for the processing for displaying input data. This input data display processing is executed, as described in Embodiment 1 above, when processing for creating a new spreadsheet is executed.

For this reason, this operation is started from the state where a spreadsheet has already been displayed on a display screen and data input was executed.

At first, in step S361, determination is made as to whether information based on data not accommodated in a cell in a previous column (left-side adjoining column) is displayed on a cell (indicating a selected cell) on which the cell cursor CSL is now present or not.

As a result, when it is determined that the information is displayed there, system control branches to step S362, and the display is deleted. Then system control proceeds to step S363. When it is determined that any information is not displayed therein, system control jumps to step S363.

In step S363, determination is made as to whether information based on whether or not the input data given to the selected cell can be displayed within a display size of the selected cell. If it is determined that the information can be displayed within the display size, system control branches to step S366, and an operation for normal display is executed.

On the other hand, when it is determined that the information can not be displayed within the selected cell, system control branches to step S364. At first determination is made whether any data is present or not in a cell in the column (right-side adjoining column) next to the selected cell. When it is determined that data is present there, system control branches to step S366, and only the information that can be displayed with the decided size is displayed.

On the other hand, when it is determined that data is not present there, system control shifts to step S365, and information based on input data is displayed over two columns making use of display areas of the selected cell and a cell in the next column.

For instance, description is made with reference to FIG. 28 for a case where "hamidashi" (Japanese word meaning overflowing) is inputted at address B2, also "hamidashi" at address E2, "567" at address F2, and "hamidashi" at address G2 on a spreadsheet.

For instance, when the cell width is "5" for columns B to J, up to 4 full-size characters (up to 8 half-size characters) can be displayed. For the character data "hamidashi" given to address B2, only two characters in the first half, namely "hami" can be displayed, and in this case it is confirmed that data is present in a cell on the next column (at address C2).

In this case, since the cell at address C2 is an empty cell, the two characters "dashi" in the latter half can be displayed in the cell.

As described above, the character data "hamidashi" given to a cell at address B2 can be displayed, as shown in FIG. 28, on the cell itself and a cell on the next column.

Likewise, for the data "hamidashi" given to a cell at address E2, since data "567" is present in a cell (at address F2) on the next column as shown in FIG. 28, only the two characters of "hami" can normally be displayed.

For a cell at column G, the next cell is on a fixed display column, conditions for displaying an overflown section are not satisfied, so only the first character of "ha" is displayed in the cell.

As described above, the method of displaying information overflown into a cell on the next column can also be applied to edit processing.

Next, description is made for processing for displaying data during the edit processing (Refer to FIG. 30). At first, in step S531, data in a selected cell having cell data is read, and determination is made in step S532 as to whether information based on the data can be displayed within a given display area or not.

Thus, if it is determined that the information can be displayed within the display area, normal display data setting is executed.

On the other hand, when it is determined that the information can not be displayed within the display area, system control branches to step S533. At first determination is made as to whether any data is already present in a cell on a column next to that on which the selected cell is present (right-side adjoining column). Thus, when it is determined that data is present in the cell, system control branches to step S535, and display data which can be displayed with the decided display size is set.

On the other hand, when any data is not present, system control branches to step S534, and display data based on the input data is set over two columns making use of a display area of the selected cell and that of a cell on the next column.

The processing described above is executed to all the selected cells each having data therein. Thus, the processing from step S531 to step S535 described above is repeatedly executed until the processing ends (step S536).

When it is confirmed that the processing described above ends in step S536, system control branches to step S537, and data is displayed in each cell based on the display data set in step S534 and step S535.

The result of this data display processing is provided, as described above, in the displayed form as shown in FIG. 28.

As described above, with Embodiment 3, when information to be displayed can not be accommodated within a cell, a portion of the information is displayed in a cell adjoining the cell and not having any data therein. Thus, the display quantity is not restricted by the cell size, and also the display area of a cell not having data therein can effectively be utilized.

In Embodiments 1 to 3 described above, when the display range for a variable display image is smaller than the cell size in the state where fixing on the right side and fixing on the left side are set up simultaneously, a scrolling operation can not be executed, and work on a variable display image can not be performed. Thus, when the size of a variable display image becomes smaller than width or height of a cell like in Embodiment 4 described below, fixing of a row or a column as an object may compulsorily be canceled.

It should be noted that, since Embodiment 4 of the present invention has, like Embodiment 1 described above, the same configuration as that shown in FIG. 1, illustration and description of each unit are omitted and the same reference numerals as that in FIG. 1 are used for each unit in the following description.

Next description is made for only operations different from those in other embodiments. FIG. 31 to FIG. 34 are views each displaying an example of display when a table frame for a spreadsheet according to Embodiment 4 is displayed.

Figure 31:
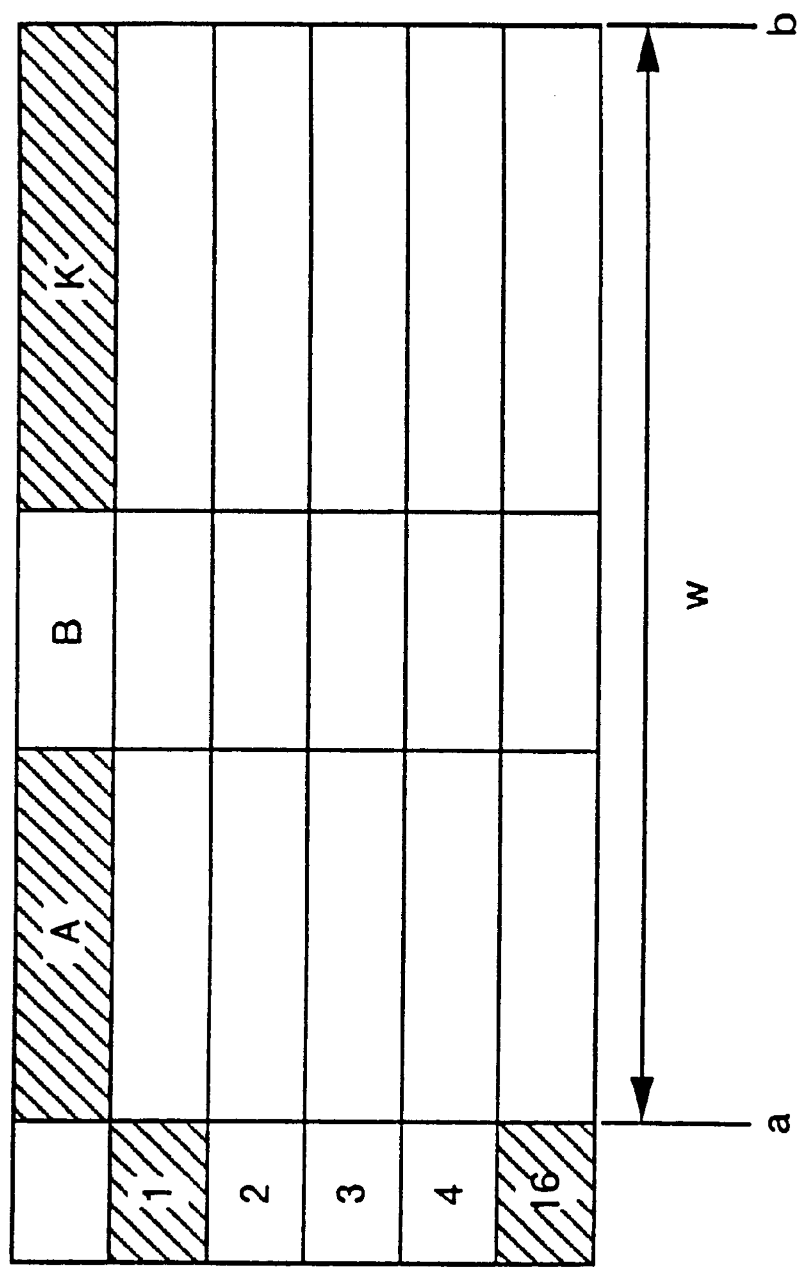
FIG. 31 is a view showing an example of display of a table frame for a spreadsheet according to Embodiment 4.

As shown in FIG. 31, when a display screen is compressed in the direction of columns, addresses for forming and displaying a table frame are rewritten in association with movement in the compressing direction.

When the operation for rewriting addresses is performed, column width L (not shown) obtained by the adding width of fixed display columns (column A and column K) to the width of a variable display column (column B) is computed, and the obtained column width L is compared the column width W on internal data. It should be noted that, in the internal data, "a" indicates a left edge position of column A which is a column for fixed display on the left side and "b" indicates a right edge position of column K which is a column for fixed display on the right side.

And, when compression advances to a higher degree and a relation of L<W is obtained, scrolling in further compression becomes impossible. Thus, column K which is valid for fixing in the right side is compulsorily made invalid, and the fixed display for the column K is released.

Figure 33:
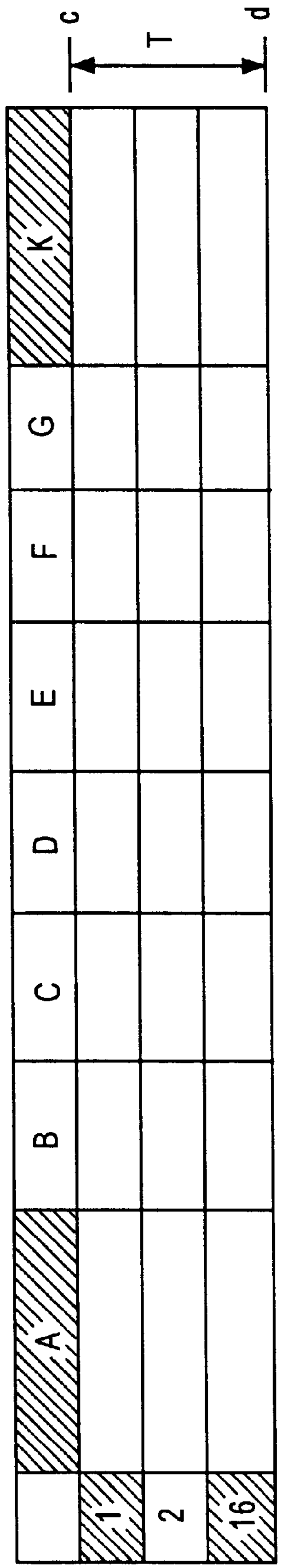
FIG. 33 is a view showing another example of display of a table frame for a spreadsheet according to Embodiment 4.

Similarly, as shown in FIG. 33, for instance, when a display screen is compressed in the direction of rows, addresses for displaying and forming a table frame are rewritten in association with movement in the compressing direction.

When the operation for rewriting addresses is executed, a row height S (not shown) obtained by adding the height of fixed display rows (rows 1 and row 16) to the height of a variable display row (row 2) is computed, and the obtained row height S is compared to row height T (shown in the figure) on internal data. It should be noted that, in the internal data, "c" indicates an upper edge position of the row 1 which is a row, from which upper rows are displayed in the fixed state, and "d" indicates a lower edge position of the row 16, from which lower rows are displayed in the fixed state.

And, when compression goes to a higher degree and a relation of $S<T$ is obtained, scrolling in further compression becomes impossible. Thus, column 16 which is valid for fixing on the lower side, is compulsorily made invalid, and fixed display for the row 16 is released.

As described above, with Embodiment 4, fixing is automatically released before a scrolling operation becomes impossible due to an operation such as compression. A user is not required to manually release the fixing, and improvement in operability becomes possible.

In Embodiments 1 to 4 of the present invention described above, a display range for a variable display image is surrounded by columns each for fixing left or right columns therefrom or rows for fixing rows upper or lower therefrom. However, as in Embodiment 5 described below, it may be specified the fixing of columns against an arbitrary column in a variable display image held between columns each for fixing columns leftward and rightward therefrom, or to specify fixing of rows against an arbitrary row in a variable display image held between rows each for fixing rows upper or lower therefrom.

It should be noted that, since this Embodiment 5 has, like Embodiment 1 described above, the configuration shown in FIG. 1, the illustration of the configuration and description of each unit are omitted herein and the same reference numeral as that in FIG. 1 are used for each unit.

Next description is made for operations different from those in other embodiments. FIG. 35 and FIG. 38 are views each showing an example of a spreadsheet for explaining format information of a spreadsheet according to Embodiment 5, and FIG. 36, FIG. 37, FIG. 39, and FIG. 40 are views each showing an example of display when a table frame for a spreadsheet according to Embodiment 5 is displayed.

Difference of Embodiment 5 from Embodiment 1 is the feature that, as indicated by MD in FIG. 35, it is possible to specify columns, between which columns are effectively fixed.

As an example, in FIG. 35, the information MD indicating validity of fixing in the central portion is given to the column D.

Accordingly, in the example shown in FIG. 35, columns which can be fixed are three columns, column A, column D, and column K, and rows which can be fixed are two rows, row 1 and row 16.

Figure 36:
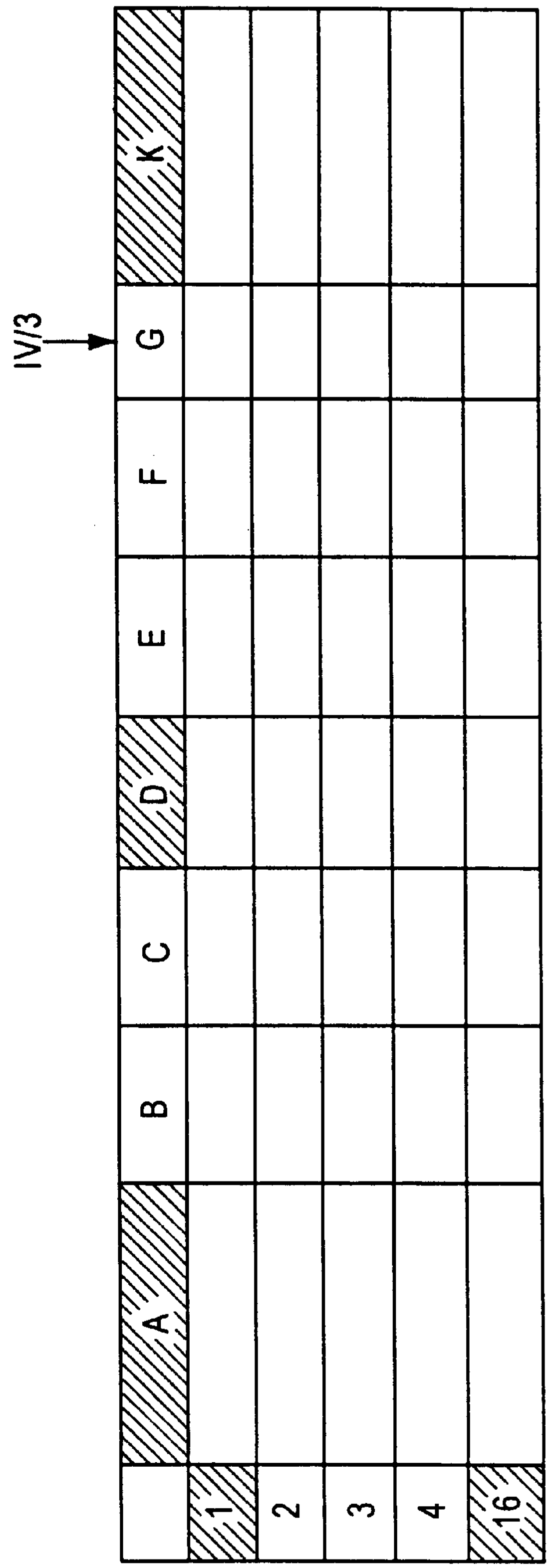
FIG. 36 is a view showing another example of display of a table frame for a spreadsheet according to Embodiment 5.

According to the format information shown in FIG. 35, as shown in FIG. 36, display column for the column D is displayed in the reversed state. Thus, it is possible to visually check that the column can be fixed.

When a variable display image is scrolled by one column in the left direction in the state shown in FIG. 36, as shown in FIG. 37, the variable columns are columns B, C, E, F, . . . J, and only the object columns for changing are moved by one column.

Namely, since each cell on the column No. D specified for fixing in the central section is displayed in the fixed state, although the entire variable display image between columns for fixing on the left side and on the right side are scrolled in other embodiments, the variable display image is divided at the column for fixing in the central section with elements for reference increased in the Embodiment 5.

Further difference of Embodiment 5 from Embodiment 1 is that, as indicated by MD in FIG. 38, it is possible to specify a row for fixing in the central section.

As an example, in FIG. 38, the information MD indicating validity of fixing in the central section is given to row 3.

For this reason, in the example shown in FIG. 38, columns valid for fixing are two columns, column A and column K, and rows valid for fixing are three rows, row 1, 3, and row 16.

According to the format information shown in FIG. 38, as shown in FIG. 39, a display column on row 3 is shown in the reversed state, and it is possible to check that the row is valid for fixing.

In the state shown in FIG. 39, when the variable display image is scrolled upward by one row, as shown in FIG. 40, the variable rows are rows 2, 4, 5, . . . 15, and the variable rows as an object for changing are moved upward by one row.

Namely, each cell on row 3 specified for fixing in the central section is displayed in the fixed state. Thus, although the entire display image between rows for fixing in the upper section and in the lower section is scrolled in other embodiments, the variable display image is divided into two sections at the row for fixing in the central section as a border in Embodiment 5, and elements for reference are increased.

As described above, with Embodiment 5 of the present invention, elements for reference are increased by specifying fixing in the central section. Thus, the scrolling operation is simplified and operability in assisting data input is improved.

In Embodiments 1 to 5 described above, an object for fixing is specified by one row or by one column, but rows for fixed display or columns for fixed display may be specified successively.

FIG. 41 is a view diagrammatically showing an example of a spreadsheet for explaining format information for a spreadsheet obtained by specifying rows or columns for fixing as described above.

As shown in FIG. 41, the validity of fixing in the left side is specified to columns A and B, the information quantity of the rows for fixing in the left side is for two columns. When the validity of fixing in the right side is specified to columns J and K, the information quantity for columns for fixing in the right side are for two columns.

Similarly, when the validity for fixing in the upper section is specified to rows 1 and 2, the information quantity for rows for fixing in the upper section is for two rows. When the validity of fixing in the lower section is specified to rows 4 and 5, the information quantity for rows for fixing in the lower section is for two rows.

As explained above, with a spreadsheet-calculating apparatus according to the present invention, an arbitrary row is displayed in the fixed state, so that non-title row, such as a computing result column, can always be referred to without scrolling. For this reason there is provided the advantage that it is possible to improve the general operability when a table is prepared.

With a spreadsheet-calculating apparatus according to the present invention, an arbitrary column is displayed in the fixed state, so that a non-title column, such as a computing result column, can always be referred to without scrolling. For this reason there is provided the advantage that it is possible to improve the general operability operation when a table is prepared.

With a spreadsheet-calculating apparatus according to the present invention, an arbitrary row or a column is displayed in the fixed state. Thus, a row or a column other than a title such as a computing result column can always be referred to without scrolling. For this reason there is provided the advantage that it is possible to improve the general operability when a table is prepared.

With a spreadsheet-calculating apparatus according to the present invention, a display area can be obtained according to a relationships between a specified range and a display screen. Thus, there is provided the advantage that it is possible to preferentially display rows, columns each to be displayed in the fixed state, or a combination of the rows and columns regardless of a size of the display screen.

With a spreadsheet-calculating apparatus according to the present invention, a display size of each cell adjoining a specified range is reduced so that the display is accommodated within the display range. Also the size of the size-reduced cells is restored to the original display size in a case where the size-reduced cells are specified, and at the same time the size of other cells within the display range is reduced. Thus, there is provided the advantage that it is possible to only obtain a minimum display size required for cells according to the size of the display range, unless the cells to be displayed at a position adjoining the specified range are specified as an object for operation such as input of data or an operational expression.

With a spreadsheet-calculating apparatus according to the present invention, a portion of information is divided and displayed when information is to be displayed, when the information cannot be accommodated, in a cell adjoining the first cell and not containing data therein. Thus, there are the advantages that it is possible to obtain a display quantity without being restricted by a cell size and also to effectively use a display area of a cell not containing data therein.

With a spreadsheet-calculating method according to the present invention, there is provided a step of displaying an arbitrary row in the fixed state. Thus, a non-title row, such as a computing result row, can always be referred to without scrolling. For this reason there is provided the advantage that it is possible to improve general operability when a table is prepared.

With a spreadsheet-calculating method according to the present invention, there is provided a step of displaying an arbitrary column in the fixed state. Thus, a non-title column, such as a computing result column, can always be referred to without scrolling. For this reason there is provided the advantage that it is possible to improve the general operability when a table is prepared.

With a spreadsheet-calculating method according to the present invention, there is provided a step of displaying a row or a column in the fixed state. Thus, a row or a column other than a title such as a computing result row or column can always be referred to without scrolling. For this reason there is provided the advantage that it is possible to improve the general operability when a table is prepared.

With a spreadsheet-calculating method according to the present invention, a display area can be obtained corresponding to a relationship between a specified range and a display screen. Thus, there is provided the advantage that it is possible to preferentially display a row or a column in the fixed state, or a combination of the row and column regardless of a size of a display screen.

With a spreadsheet-calculating method according to the present invention, there are provided steps of reducing the display size of each cell adjoining the specified range reduced to be accommodated within the display range, and also of restoring the size of the size-reduced cells to the original display size when the size-reduced cells are specified and at the same time a size of other cells within the display range is reduced. Thus, there is provided the advantage that it is possible to obtain the minimum display size needed for cells according to the size of the display range, unless the cells to be displayed at a position adjoining the specified range are specified as an object for an operation for inputting data or an operational expression.

With a spreadsheet-calculating method according to the present invention, there is provided a step of dividing information and displaying a portion thereof, when the displayed information cannot be accommodated in a cell, in a cell adjoining the cell and not containing data therein. Thus, there are provided the advantages that it is possible to obtain display quantity not restricted by a cell size, and also to effectively use a display area of a cell not containing data therein.

With a computer-readable medium according to the present invention, there is provided a sequence of instructions for displaying an arbitrary row in the fixed state. Thus, a nontitle row, such as a computing result row, can always be referred to without scrolling. For this reason there is provided the advantage that it is possible to improve the general operability when a table is prepared.

With a computer-readable medium according to the present invention, there is provided a sequence of instructions for displaying an arbitrary column in the fixed state. Thus, a non-title column, such as a computing result column, can always be referred to without scrolling. For this reason there is provided the advantage that it is possible to improve the general operability when a table is prepared.

With a computer-readable medium according to the present invention, there is provided a sequence of instructions for displaying an arbitrary row or a column in the fixed state. Thus, a row or a column other than a title, such as a computing result row or column, can always be referred to without scrolling. For this reason there is provided the advantage that it is possible to improve the general operability when a table is prepared.

With a computer-readable medium according to the present invention, a display area can be obtained according to a relationship between a specified range and a display screen. Thus, there is provided the advantage that it is possible to preferentially display a row or a column in the fixed state, or a combination thereof regardless of the size of the display screen.

With a computer-readable medium according to the present invention, there are provided sequences of instructions for reducing the display size of each cell adjoining a specified range to be accommodated within the display range, and also for restoring the size of the size-reduced cells to the original display size when the size-reduced cells are specified and at the same time reducing the size of other cells within the display range. Thus, there is provided the advantage that it is possible to obtain the minimum display size needed for cells according to the size of the display range, unless the cells to be displayed at a position adjoining the specified range are specified as an operation for inputting data or an operational expression.

With a computer-readable medium according to the present invention, there is provided a sequence of instructions for dividing information and displaying a portion thereof, when the displayed information cannot be accommodated in a cell, in a cell adjoining the cell and not containing data therein. Thus, there are provided the advantages that it is possible to obtain a display quantity without being restricted by the cell size and also it is possible to effectively use the display area of a cell not containing data therein.

This application is based on Japanese patent application No. HEI 9-7991 filed in the Japanese Patent Office on Jan. 20, 1997, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A spreadsheet-calculating apparatus for storing data in correlation to each cell in a table frame in which a plurality of cells are arrayed in the directions of rows and columns and displaying information based on said stored data at a display position of said each cell, comprising:

a specifying means for specifying an arbitrary fixed row from said table frame while said table frame is displayed;

a storage means for storing therein the arbitrary fixed row specified by said specifying means as a fixed display row and also each row located on the upper side from said arbitrary fixed row as variable display row;

a determining means for determining, when said table frame is to be displayed by using the fixed display row stored and variable display rows stored in said storage means, whether the variable display rows stored in said storage means can be accommodated in a prespecified display area or not;

an allocating means for allocating a display range from the variable display rows stored in said storage means according to a size of said prespecified display area only when it is determined by said determining means that the variable display rows cannot be accommodated;

a partially displaying means for displaying a portion of said table frame by using the fixed display row stored in said storage means and the variable display rows allocated by said allocating means as a display area when it is determined by said determining means that a portion of the variable display rows can not be accommodated therein; and a display control means for providing controls to move said variable display rows displayed in said prespecified display area in the column direction in a case where, during display by said partially displaying means, the variable display rows recognized by said allocating means as outside said prespecified display area are to be displayed.

2. A spreadsheet-calculating apparatus according to claim 1, wherein said determining means obtains said prespecified display area in a previously prepared display screen excluding a range specified by said specifying means.

3. A spreadsheet-calculating apparatus according to claim 1, wherein said partially displaying means comprises:

a size-reducing means for reducing a display size of each cell adjoining the range specified by said specifying means within the display range allocated by said allocating means; and a size-restoring means for specifying size-reduced cells by said size-reducing means, restoring a size of said each cell to the original display size and at the same time reducing a size of other cells within said display range.

4. A spreadsheet-calculating apparatus according to claim 1 further comprising:

a cell display determining means for determining whether information in each cell can be accommodated or not when information based on said stored data is to be displayed; and a cell sorting/displaying means for distinguishing and displaying information as an object for display for cells to be displayed and for cells adjoining the cells as an object for display and not containing data therein separately, when it is determined by said cell display determining means that information for each cell cannot be accommodated.

5. A spreadsheet-calculating apparatus for storing data in correlation to each cell in a table frame in which a plurality of cells are arrayed in the directions of rows and columns and displaying information based on said stored data at a display position of said each cell comprising:

a specifying means for specifying an arbitrary fixed column from said table frame while said table frame is displayed;

a storage means for storing therein the arbitrary fixed column specified by said specifying means as a fixed display column and also each column located on the left side from said arbitrary fixed column as a variable display column;

a determining means for determining, when said table frame is to be displayed by using the fixed display column stored and variable display columns stored in said storage means, whether the variable display columns stored in said storage means can be accommodated in a prespecified display area or not;

an allocating means for allocating a display area from the variable display columns stored in said storage means according to a size of said prespecified display area only when it is determined by said determining means that the variable display columns cannot be accommodated;

a partially displaying means for displaying a portion of said table frame by using the fixed display column stored in said storage means and the variable display columns allocated as an display object column by said allocating means when it is determined by said determining means that a portion of the variable display columns cannot be accommodated; and a display control means for providing controls to move said variable display columns displayed in said prespecified display area in the row direction in a case where, during display by said partially displaying means, the variable display columns recognized by said allocating means as outside said prespecified display area are to be displayed.

6. A spreadsheet-calculating apparatus according to claim 5, wherein said determining means obtains said prespecified display area in a previously prepared display screen excluding a range specified by said specifying means.

7. A spreadsheet-calculating apparatus according to claim 5, wherein said partially displaying means comprises:

a size-reducing means for reducing a display size of each cell adjoining the range specified by said specifying means within the display range allocated by said allocating means; and a size-restoring means for specifying size-reduced cells by said size-reducing means, restoring a size of said each cell to the original display size and at the same time reducing a size of other cells within said display range.

8. A spreadsheet-calculating apparatus according to claim 5 further comprising:

a cell display determining means for determining whether information in each cell can be accommodated or not when information based on said stored data is to be displayed; and a cell distinguishing/displaying means for distinguishing and displaying information as an object for display for cells to be displayed and for cells adjoining the cells as an object for display and not containing data therein separately, when it is determined by said cell display determining means that information for each cell can not be accommodated.

9. A spreadsheet-calculating apparatus for storing data in correlation to each cell in a table frame in which a plurality of cells are arrayed in the directions of rows and columns and displaying information based on said stored data at a display position of said each cell comprising:

a specifying means for specifying an arbitrary fixed row and an arbitrary fixed column from said table frame while said table frame is displayed;

a storage means for storing therein the arbitrary fixed row and arbitrary fixed column specified by said specifying means as a fixed display row and a fixed display column respectively, and each row located on the upper side from said arbitrary fixed row as a variable display row, and also each column on the left side from said arbitrary fixed column as a variable display column;

a determining means for determining, when said table frame is to be displayed by using a fixed display row and variable display rows as well as a fixed display column and variable display columns stored in said stored means, whether either one or both the variable display rows and variable display columns storage in said storage means can be accommodated in a prespecified display area or not;

an allocating means for allocating a display area from the variable display rows stored in said storage means according to a size of said prespecified display area only when it is determined by said determining means that a portion of the variable display rows can not be accommodated, allocating a display area from the variable display columns stored in said storage means according to a size of said prespecified display area only when it is determined by said determining means that a portion of the variable display columns can not be accommodated, and allocating a display area from the variable display rows and variable display columns stored in said storage means according to a size of said prespecified display area only when it is determined by said determining means that both the variable display rows and variable display columns can not be accommodated;

a partially displaying means for displaying a portion of said table frame according to a result of allocation by said allocating means when it is determined by said determining means that a portion of the variable display rows can not be accommodated, when it is determined by said determining means that a portion of the variable display columns can not be accommodated, or when it is determined by said determining means that both the variable display rows and variable display columns cannot be accommodated; and a display control means for providing controls during display by said partially display means so that said variable display rows displayed in said prespecified display area are moved in the column direction when the variable display rows recognized by said allocating means as outside said prespecified display area are to be displayed, whereby said variable display columns displayed in said prespecified display area are moved in the row direction when the variable display columns recognized by said allocating means as outside said prespecified display area are to be displayed, or whereby said variable display rows and said variable display columns displayed in said prespecified display area are moved in the column direction and row direction respectively when the variable display rows and variable display columns recognized by said allocating means as outside said prespecified display area are to be displayed.

10. A spreadsheet-calculating apparatus according to claim 9, wherein said determining means obtains said prespecified display area in a previously prepared display screen excluding a range specified by said specifying means.

11. A spreadsheet-calculating apparatus according to claim 9, wherein said partially displaying means comprises:

a size-reducing means for reducing a display size of each cell adjoining the range specified by said specifying means within the display range allocated by said allocating means; and a size-restoring means for specifying size-reduced cells by said size-reducing means, restoring a size of said each cell to the original display size and at the same time reducing a size of other cells within said display range.

12. A spreadsheet-calculating apparatus according to claim 9, further comprising:

a cell display determining means for determining whether information in each cell can be accommodated or not when information based on said stored data is to be displayed; and a cell distinguishing/displaying means for distinguishing and displaying information as an object for display for cells to be displayed and for cells adjoining the cells as an object for display and not containing data therein separately when it is determined by said cell display determining means that information for each cell can not be accommodated.

13. A spreadsheet-calculating method in which data is stored in correlation to each cell in a table frame in which a plurality of cells are arrayed in the directions of row and column and information is displayed based on data stored at a display position for said each cell comprising:

a first step of specifying an arbitrary fixed row in the table frame while said table frame is displayed;

a second step of determining, when said table frame is to be displayed by using the fixed display row which is a row specified in said first step and variable display rows not specified in said first step, whether the variable display rows specified in said first step can be accommodated in a prespecified display area or not;

a third step of allocating a display range from the variable display rows specified in said first step according to a size of said prespecified display area only when it is determined in said second step that the variable display rows specified in said first step can not be accommodated in said prespecified display area, a fourth step of displaying a portion of said table frame by using the fixed display row specified in said first step and the variable display rows allocated as a display range in said third step when it is determined in said second step that the variable display rows specified in said first step can not be accommodated in said prespecified display area; and a fifth step of providing controls to more said variable display rows displayed in said prespecified display area in the column direction in a case where, during display in said fourth step, the variable display rows recognized in said third step for allocation as outside said prespecified display area are to be displayed.

14. Spreadsheet-calculating method according to claim 13, wherein, in said second step, said prespecified display area is obtained in the previously-prepared display screen excluding the range specified in said first step.

15. A spreadsheet-calculating method according to claim 13, wherein said fourth step includes a fifth step of reducing a display size of each cell adjoining the range specified in said first step within the display range allocated by said allocating means and a sixth step of specifying cells reduced in said fifth step and restoring a size of said each cell to the original display size and at the same time reducing other cells in said display range.

16. A spreadsheet-calculating method according to claim 13 further comprising:

a seventh step of determining, when information based on said stored data is to be displayed, whether the information for each cell can be accommodated or not; and an eighth step of sorting and displaying, when it is determined in said seventh step that information for each cell can not be accommodated, information as an object for display for cells as an object for display and for cells adjoining the object for display and not containing any data therein.

17. A spreadsheet-calculating method in which data is stored in correlation to each cell of a table frame in which a plurality of cells are arrayed in the row and column directions and information is displayed based on data stored at a display position for each cell comprising:

a first step of specifying an arbitrary fixed column in said table frame while said table frame is displayed;

a second step of determining, when said table frame is to be displayed by using the fixed display column which is a column specified in said first step and the variable display columns which are columns not specified in said first step, whether the variable display columns specified in said first step can be accommodated in said prespecified display area or not;

a third step of allocating a display range from the variable display columns specified in said first step according to a size of said prespecified display area only when it is determined in said second step that the variable display columns can not be accommodated;

a fourth step of displaying a portion of said table frame by using the fixed display column specified in said first step and the variable display columns allocated as a display range in said third step when it is determined in said second step that the variable display columns can not be accommodated; and a fifth step of providing controls so that said variable display columns displayed in said prespecified display area are moved in the row direction when, during display in said fourth step, the variable display columns recognized in said third step for allocation as outside said prespecified display area.

18. Spreadsheet-calculating method according to claim 17, wherein, in said second step, said prespecified display area is obtained in the previously-prepared display screen excluding the range specified in said first step.

19. A spreadsheet-calculating method according to claim 17, wherein said fourth step includes a fifth step of reducing a display size of each cell adjoining the range specified in said first step within the display range allocated by said allocating means and a sixth step of specifying cells reduced in said fifth step and restoring a size of said each cell to the original display size and at the same time reducing other cells in said display range.

20. A spreadsheet-calculating method according to claim 17 further comprising:

a seventh step of determining, when information based on said stored data is to be displayed, whether the information for each cell can be accommodated or not; and an eighth step of sorting and displaying, when it is determined in said seventh step that information for each cell can not be accommodated, information as an object for display for cells as an object for display and for cells adjoining the object for display and not containing any data therein.

21. A spreadsheet-calculating method in which data is stored in correlation to each cell of a table frame in which a plurality of cells are arrayed in the row and column directions and information is displayed based on data stored at a display position for said each cell comprising:

a first step of specifying an arbitrary fixed row and an arbitrary fixed column in said table frame while said table frame is displayed;

a second step of determining, when said table frame is to be displayed by using the fixed display row which is a row specified in said first step and the variable display rows which are rows not specified in said first step as well as the fixed display column which is a column specified in said first step and the variable display columns which are columns not specified in said first step, whether either one or both said variable display rows and said variable display columns can be accommodated in the prespecified display area or not;

a third step of allocating a display range from said variable display rows according to a size of said prespecified display area only when it is determined in said second step that a portion of the variable display rows can not be accommodated, allocating a display range from the variable display columns stored in said storage means according to a size of said prespecified display area only when it is determined in said second step that a portion of the variable display columns can not be accommodated, or allocating a display range from said variable display rows and variable display columns according to a size of said prespecified display area only when it is determined by said determining means that both the variable display rows and variable display columns can not be accommodated;

a fourth step of displaying a portion of said table frame according to a result of allocation in said third step in a case where it is determined in said second step that the variable display rows can not be accommodated, when it is determined in said second step that the variable display columns can not be accommodated, or when it is determined in said second step that both the variable display rows and variable display columns cannot be accommodated; and a fifth step of providing controls so that the variable display rows displayed in said prespecified display area are moved in the column direction when, during display in said fourth step, the variable display rows recognized in said third step for allocation as outside said prespecified display area are to be displayed, so that said variable display columns displayed in said prespecified display area are moved in the row direction when, during display in said fourth step, the variable display rows recognized in said third step for allocation as outside said prespecified display area are to be displayed, or so that said variable display rows and said variable display columns displayed in said prespecified display area are moved in the column direction and in the row direction respectively, when, during display in said fourth step, the variable display rows and variable display columns recognized in said third step for allocation as outside said prespecified display area are to be displayed.

22. Spreadsheet-calculating method according to claim 21, wherein, in said second step, said prespecified display area is obtained in the previously-prepared display screen excluding the range specified in said first step.

23. A spreadsheet-calculating method according to claim 21, wherein said fourth step includes a fifth step of reducing a display size of each cell adjoining the range specified in said first step within the display range allocated by said allocating means and a sixth step of specifying cells reduced in said fifth step and restoring a size of said each cell to the original display size and at the same time reducing other cells in said display range.

24. A spreadsheet-calculating method according to claim 21 further comprising:

a seventh step of determining, when information based on said stored data is to be displayed, whether the information for each cell can be accommodated or not; and an eighth step of distinguishing and displaying, when it is determined in said seventh step that information for each cell can not be accommodated, information as an object for display for cells as an object for display and for cells adjoining the object for display and not containing any data therein.

25. A computer-readable medium having stored thereon sequences of instructions for having a computer execute a spreadsheet-calculating sequence on data stored in correlation to each cell of a table frame in which a plurality of cells are arrayed in the row and column direction for displaying information based on said stored data at a display position for each cell is recorded, said sequences of instructions comprising:

first sequences of instructions for specifying an arbitrary fixed row in said table frame while said table frame is displayed;

second sequences of instructions for determining, when said table frame is to be displayed by using the fixed display row which is a row specified in said sequences of instructions and variable display rows which are rows not specified in said first sequences of instructions, whether the variable display rows specified in said first sequences of instructions can be accommodated in a prespecified display area or not;

third sequences of instructions for allocating a display range from the variable display rows specified in said first sequences of instructions according to a size of said prespecified display area only when it is determined in said second sequences of instructions that the variable display rows cannot be accommodated;

fourth sequences of instructions for displaying a portion of said table frame by using the fixed display row specified in said first sequences of instructions and the variable display rows allocated as a display range in said third sequences of instructions when it is determined in said second sequences of instructions that the variable display rows can not be accommodated; and fifth sequences of instructions for providing controls so that said variable display rows displayed in said prespecified area are moved in the column direction in a case where, during display in said fourth sequences of instructions, the variable display rows recognized in said third sequences of instructions for allocation as outside said prespecified display area are to be displayed.

26. A computer-readable medium having stored thereon sequences of instructions for having a computer execute a spreadsheet-calculation on data stored in correlation to each cell of a table frame in which a plurality of cells are arrayed in the row and column direction and for displaying information based on said stored data at a display position for said each cell is recorded, said sequences of instructions comprising:

first sequences of instructions for specifying an arbitrary fixed column in said table frame while said table frame is displayed;

second sequences of instructions for determining, in a case where said table frame is to be displayed by using the fixed display column which is a column specified in said first sequences of instructions and the variable display columns which are columns not specified in said first sequences of instructions, whether the variable display columns specified in said first sequences of instructions can be accommodated in a prespecified display area or not;

third sequences of instructions for allocating a display range from the variable display columns specified in said first sequences of instructions according to a size of said prespecified display area only when it is determined in said second sequences of instructions that the variable display columns can not be accommodated;

fourth sequences of instructions for displaying a portion of said table frame by using the fixed display column specified in said first sequences of instructions and the variable display columns allocated as a display range in said third sequences of instructions when it is determined in said second sequences of instructions that the variable display columns cannot be accommodated; and fifth sequences of instructions for providing controls so that said variable display columns displayed in said prespecified display area are moved in the row direction when, during display in said fourth sequences of instructions, the variable display columns recognized in said third sequences of instructions for allocation as outside said prespecified display area are to be displayed.

27. A computer-readable medium having stored thereon sequences of instructions for having a computer execute a spreadsheet-calculating sequence on data stored in correlation to each cell of a table frame in which a plurality of cells are arrayed in the row and column direction and for displaying information based on said stored data at a display position for said each cell is recorded, said sequences of instructions comprising:

first sequences of instructions for specifying an arbitrary fixed row and an arbitrary fixed column in said table frame while said table frame is displayed;

second sequences of instructions for determining, when said table frame by using the fixed display row which is a row specified in said first sequences of instructions and the variable display rows which are rows not specified in said first sequences of instructions as well as the fixed display column which is a column specified in said first sequence and the variable display columns which are columns not specified in said first sequences of instructions is to be displayed, whether either one or both said variable display rows and variable display columns can be accommodated in a prespecified display area or not;

third sequences of instructions for allocating a display range from said variable display rows according to a size of said prespecified display area only when it is determined in said second sequences of instructions that the variable display rows cannot be accommodated, allocating a display range from the variable display columns stored in said storage means according to a size of said prespecified display area only when it is determined in said second sequences of instructions that the variable display columns cannot be accommodated, or allocating a display range from said variable display rows and variable display columns according to a size of said prespecified display area only when it is determined in said second sequences of instructions that both the variable display rows and said variable display columns cannot be accommodated;

fourth sequences of instructions for displaying a portion of said table frame by according to a result of allocation in said third sequences of instructions when it is determined in said second sequences of instructions that the variable display rows cannot be accommodated, when it is determined in said second sequences of instructions that the variable display columns cannot be accommodated, or when it is determined in said second sequences of instructions that both the variable display rows and said display columns cannot be accommodated; and fifth sequences of instructions for providing controls so that said variable display rows displayed in said prespecified display area are moved in the column direction when, during display in said fourth sequences of instructions, the variable display rows as recognized in said third sequences of instructions for allocation as outside said prespecified display area are to be displayed, so that said variable display columns displayed in said prespecified display area are moved in the row direction when, during display in said fourth sequences of instructions, the variable display columns recognized in said third sequences of instructions for allocation as outside said prespecified display area are to be displayed, or so that said variable display rows and said variable display columns displayed in said prespecified display area are moved in the column direction and in the row direction respectively when, during display in said fourth sequences of instructions, the variable display rows and variable display columns recognized in said third sequences of instructions for allocation as outside said prespecified display area are to be displayed.

* * * * *